US008780798B2

(12) United States Patent
Parkvall et al.

(10) Patent No.: US 8,780,798 B2
(45) Date of Patent: Jul. 15, 2014

(54) METHOD AND DEVICES FOR PROVIDING ENHANCED SIGNALING

(75) Inventors: Stefan Parkvall, Stockholm (SE); Ylva Jading, Stockholm (SE); Erik Dahlman, Bromma (SE); David Astely, Bromma (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 767 days.

(21) Appl. No.: 12/990,404

(22) PCT Filed: Feb. 5, 2008

(86) PCT No.: PCT/SE2008/000177
§ 371 (c)(1),
(2), (4) Date: Jan. 24, 2011

(87) PCT Pub. No.: WO2009/110821
PCT Pub. Date: Sep. 11, 2009

(65) Prior Publication Data
US 2011/0103338 A1  May 5, 2011

(51) Int. Cl.
*H04W 4/20* (2009.01)
(52) U.S. Cl.
CPC ...................................... *H04W 4/20* (2013.01)
USPC ......................................................... 370/328
(58) Field of Classification Search
CPC . H04J 11/0069; H04J 11/0089; H04W 4/005; H04W 4/20; H04W 8/005; H04W 28/0215; H04W 72/048
USPC ................ 370/254, 310, 312, 328, 432, 465; 455/422.1
See application file for complete search history.

(56) References Cited

U.S. PATENT DOCUMENTS

| 7,206,604 B2 | 4/2007 | Berra et al. |
| 2006/0156370 A1* | 7/2006 | Parantainen ................... 725/132 |
| 2007/0086437 A1* | 4/2007 | DiFazio et al. ................ 370/352 |
| 2008/0095195 A1* | 4/2008 | Ahmadi et al. ................ 370/478 |
| 2008/0144612 A1* | 6/2008 | Honkasalo et al. ............ 370/370 |
| 2008/0318558 A1* | 12/2008 | Bouazizi et al. ........... 455/414.1 |

FOREIGN PATENT DOCUMENTS

| CN | 101120610 A | 2/2008 |
| WO | 2006088301 A1 | 8/2006 |
| WO | 2007/044282 A1 | 4/2007 |

OTHER PUBLICATIONS

Author Unknown. "Long Term Evolution (LTE): A Technical Overview." Technical White Paper, Motorola, Inc. 2007.
3rd Generation Partnership Project. "EUTRA Downlink Pilot Requirements and Design." 3GPP TSG RAN WG1 #42, R1-050714, London, UK, Aug. 29-Sep. 2, 2005.
3rd Generation Partnership Project. "MBMS Transmission in E-UTRA." 3GPP TSG RAN WG1 #43, 1-051300, Seoul, Korea, Nov. 7-11, 2005.

(Continued)

*Primary Examiner* — Paul H Masur
(74) *Attorney, Agent, or Firm* — Coats & Bennett, P.L.L.C.

(57) ABSTRACT

Methods and devices for introducing enhanced signals into a wireless environment. The enhanced signals provide for functionality that is not specified in a communication standard corresponding to a standard of a legacy terminal. The enhanced signals can be utilized by a non-legacy terminal. The legacy terminal is incapable of processing the enhanced signals and is unable to detect the presence of the enhanced signals.

15 Claims, 23 Drawing Sheets

(56) References Cited

OTHER PUBLICATIONS

3rd Generation Partnership Project. "Multiplexing of MBMS and Unicast Transmission in E-UTRA Downlink." 3GPP TSG RAN WG1 LTE AdHoc, R1-060054, Helsinki, Finland, Jan. 23-25, 2006.
3rd Generation Partnershp Project. "Reference Signals for Mixed Carrier MBMS." 3GPP TSG-RAN WG1 Meeting #48, R1-070990, St. Louis, US, Feb. 12-16, 2007.

3rd Generation Partnership Project. 3GPP TS 36.201, V0.3.1 (Mar. 2007). 3rd Generation Partnership Project; Technical Specification Group Radio Access Network; LTE Physical Layer—General Description (Release 8). Mar. 2007.
SA3, "MBMS security capabilities announcement", 3GPP TSG SA WG3 Security—SA3#47, May 22-25, 2007, Tallinn, Estonia, S3-070493.

* cited by examiner

METHOD AND DEVICES FOR PROVIDING ENHANCED SIGNALING

TECHNICAL FIELD

The concepts described herein relate generally to methods and arrangements in a network. More particularly, the concepts described herein relate to methods and arrangements for utilizing resources to provide enhanced signaling within a communication standard without impacting legacy devices.

BACKGROUND

A downlink transmission of the long term evolution (LTE) or evolved universal terrestrial radio access network (E-UTRAN) is based on orthogonal frequency division multiplexing (OFDM). For example, as illustrated in FIG. 1, the LTE downlink may be modeled as an OFDM time-frequency grid 100, where each resource element 105 may correspond to one OFDM sub-carrier during one OFDM symbol interval. The downlink sub-carrier spacing may correspond to 15 kHz.

In the frequency domain, the downlink sub-carriers may be grouped into resource blocks, where each resource block includes twelve consecutive sub-carriers. The LTE physical layer standard permits a downlink carrier to include any number of resource blocks ranging from six and upwards.

FIG. 2 illustrates an exemplary time-domain structure 200 for LTE downlink or uplink transmissions. As illustrated, a LTE transmission may include radio frames 205. Each radio frame 205 may be equivalent to 10 milliseconds (ms), and may include a series of sub-frames 210. Each sub-frame 210 may have duration of 1 ms. Sub-frame 210 may include two slots 215. Each slot 215 may have duration of 0.5 ms.

FIG. 3 illustrates an exemplary time-domain structure 300 for a slot 215. Slot 215 may include a number of OFDM symbols. The LTE standard defines two cyclic-prefix (CP) lengths, a normal CP 305 and an extended CP 320. Normal CP 305 may include seven OFDM symbols, and extended CP 320 may include six OFDM symbols. Additionally, normal CP 305 may include a CP 310 and CPs 315, where CP 310 may be longer than CP 315 in order to fill up the entire 0.5 ms of slot 215. Extended CP 320 may include a CP 325. Extended CP 320 may be employed with a multicast/broadcast single-frequency network (MBSFN) transmission.

In the time-domain the resource blocks may consist of 12 subcarriers during a 0.5 ins slot. Each resource block thus consists of 12·7=84 resource elements in case of normal cyclic prefix and 12·6=72 resource elements in case of extended cyclic prefix According to the LTE standard, downlink reference signals may consist of reference symbols that are known symbols inserted into an OFDM time-frequency grid. The reference signals may be used by the user equipment (UE) for, among other things, downlink channel estimation, to enable coherent detection. Also in the LTE standard, a downlink antenna port corresponds to an antenna that is visible to a UE, the antenna having a unique set of reference symbols (i.e., one antenna mapping to one antenna port). However, in other implementations, multiple antennae may be mapped to the same antenna port, transmit the same set of reference symbols, and may not be distinguishable to a UE.

Currently, there are three types of reference signals that may be transmitted on the LTE downlink: cell-specific reference signals, MBSFN reference signals, and UE-specific reference signals (sometimes referred to as dedicated reference signals). The cell-specific reference signals may correspond to a downlink transmit antenna port (up to four). MBSFN reference signals may relate to an MBSFN frame. A UE specific reference signal may be transmitted on the downlink and may be used for channel estimation by a certain UE or group of UEs.

FIG. 4 illustrates an exemplary OFDM time-frequency grid 400. OFDM time-frequency grid 400 relates to a single transmit antenna associated with an antenna port 405. As illustrated, a cell-specific unicast reference signal may be inserted into a specific resource element. That is, reference symbols 410 may be inserted within the first and the third to the last resource element of a slot. A resource block includes four reference symbols.

In case of a downlink multi-antenna transmission (e.g., transmit diversity and spatial multiplexing), a UE may be able to identify and estimate a channel corresponding to each transmit antenna. Thus, there is a downlink reference signal transmitted from each antenna port.

FIGS. 5A and 5B illustrate an exemplary OFDM time-frequency grid 500 associated with two transmit antenna ports 505 and 520. As illustrated, reference symbols 510 of antenna port 505 are frequency-shifted by three sub-carriers relative to reference symbols 525 of antenna port 520. OFDM time-frequency grid 500 of antenna port 505 includes unused resource elements 515 and OFDM time-frequency grid 500 of antenna port 520 includes unused resource elements 530. In this regard, there is no interference to reference symbols between different antenna ports. FIGS. 6A-6D illustrate an exemplary OFDM time-frequency grid 600 associated with four transmit antenna ports 605, 620, 635, and 650. As illustrated, reference symbols 610, 625, 640, and 655 may be transmitted from antenna ports 605, 620, 635, and 650, respectively. Additionally, OFDM time-frequency grid 600 includes unused resource elements 615, 630, 645, and 660 corresponding to antenna ports 605, 620, 635, and 650, respectively. The reference symbol density of antenna ports 635 and 650 may be less than the reference symbol density of antenna ports 605 and 620.

Downlink layer one and layer two (L1/L2) control signaling is used for transmitting downlink scheduling assignments required for a UE to properly receive, demodulate and decode a downlink shared channel (DL-SCH), uplink scheduling grants that inform a UE about resources and transport format for uplink (UL)-SCH transmission, and hybrid automatic repeat request (ARQ) acknowledgements in response to UL-SCH transmission.

FIG. 7 illustrates an exemplary OFDM time-frequency grid 700 of a sub-frame 705 having slots 710 and 715. Downlink L1/L2 control channels are mapped to the first (up to three) OFDM symbols within a sub-frame, such as sub-frame 705. Thus, sub-frame 705 may include a L1/L2 control region 720 and a data region 725. A size of control region 720 may be equal to an integer number of OFDM symbols (e.g., one, two, or three OFDM symbols) and may vary per sub-frame 705. In this regard, control signaling overhead may be adjusted to match a traffic situation and maximize spectral efficiency. Also, by locating the L1/L2 control signaling at the beginning of sub-frame 705, a UE may decode the L1/L2 control signaling (e.g., a downlink scheduling assignment) prior to an end of sub-frame 705. Thus, for example, decoding of the DL-SCH may begin directly after the end of sub-frame 705 without having to wait for the decoding of the L1/L2 control information, which may minimize the delay associated with the DL-SCH decoding and/or the overall downlink transmission delay. Additionally, or alternatively, by transmitting the L1/L2 control information at the beginning of sub-frame 705, an unscheduled UE may turn off its receiver circuitry for a portion of sub-frame 705 to reduce power consumption.

Downlink L1/L2 control signaling may be mapped to the following physical channels: a physical control format indicator channel (PCFICH), a physical downlink control channel (PDCCH), and a physical hybrid-ARQ indicator channel (PHICH).

The PCFICH is used to inform a UE about the number of OFDM symbols (e.g., one, two, or three) used for L1/L2 control signaling in the current sub-frame, or equivalently, where in the sub-frame the data region begins. If the PCFICH is incorrectly decoded, the UE will neither know where to find the control channels, nor where the data region begins, and will forfeit any uplink scheduling grants transmitted, as well as any DL-SCH data transmission intended for the UE.

FIG. 8 illustrates an exemplary PCFICH processing scheme 800. As illustrated, two bits of information corresponding to a control region size of one, two, or three OFDM symbols (a fourth bit combination is reserved for future use), are coded into a 32-bit long sequence using, for example, a rate-1/16 simplex block 805. The coded bits are scrambled 810, Quadrature Phase-Shift Keying (QPSK) modulated 815, and mapped to 12 resource elements in the control region 820. To be compatible with different transmit diversity schemes, which are specified in groups of four symbols, the 16 resource elements are grouped into four groups of four elements each. The four groups are separated in frequency to obtain diversity. Further, to avoid inter-cell PCFICH collisions, the location of the four groups in the frequency domain may depend on the physical layer cell identity. The transmission power of the PCFICH may be under the control of an enhanced Node B (eNodeB). If necessary for coverage in a particular cell, the power of the PCFICH may be set higher than other channels by "borrowing" power from, for example, PDCCHs.

The PDCCH is used to carry downlink scheduling assignments (e.g., a physical downlink shared channel (PDSCH) resource indication, a transport format, hybrid-ARQ information, a transport block size, multiple-in multiple-out (MIMO) related control information, and/or a physical uplink control channel (PUCCH) power control commands), uplink scheduling grants (e.g., a physical uplink shared channel (PUSCH) resource indication, a transport format, hybrid-ARQ information, and/or a PUSCH power control command), and/or power control commands of a group of UEs (e.g., as a complement to the power control commands piggy-backed with scheduling decisions).

Since multiple UEs may be scheduled simultaneously on both downlink and uplink, multiple scheduling messages may be transmitted within each sub-frame. For example, each such message is transmitted on a separate PDCCH, and consequently, there are multiple PDCCHs in each cell and each UE may monitor multiple PDCCHs.

Different scheduling messages may have different payload sizes. For example, supporting spatial multiplexing with non-contiguous allocation of resource blocks in the frequency domain, may require a larger scheduling message than an uplink grant supporting contiguous allocation. Link adaptation (i.e., to match a code rate of the error-correcting code of the PDCCH to the instantaneous radio conditions) may also be supported. Thus, there may be multiple formats for the PDCCH where each format may be defined by the payload size and the code rate.

FIG. 9 illustrates an exemplary PDCCH processing scheme 900. As illustrated, a cyclic redundancy check (CRC) 905 may be attached to each PDCCH payload (e.g., PDCCH-1, PDCCH-2, etc.). A medium access control (MAC) identifier (e.g., a radio network temporary identity (RNTI)) may be included in the CRC calculation.

Subsequent to attaching a CRC, channel coding 910 (e.g., tail-biting convolution codes), rate matching 915, scrambling 920 and QPSK modulation 925 may be performed, respectively. Depending on the PDCCH message size (i.e., three sizes are supported: size A, B and C), and the channel coding rate (including rate matching), the size of the coded PDCCH may correspond to one, two, four, or eight control channel elements (CCEs). Each CCE may correspond to 36 resource elements (for e.g. 5 mega-hertz (MHz) cell bandwidth).

The modulated PDCCHs may be multiplexed 930. In one implementation, all of the CCEs corresponding to PDCCH-1 may be followed by all of the CCEs corresponding to PDCCH-2, etc. The multiplexed CCEs may be mapped to resource elements, such as, in groups of four QPSK symbols, to support the different transmit diversity schemes. The multiplexed CCEs may then be scrambled 935, interleaved 940, and/or shifted with a cell-specific shift 945. Cell-specific shifter 945 may random the mapping between different cells.

Upon reception of the PDCCH payload, a UE may check the CRC using its own identifier (e.g., a RNTI). If the CRC checks, the PDCCH payload may be declared as being correctly received and intended for the UE. In this way, the identity of the UE intended to receive the PDCCH payload may be implicitly encoded in the CRC and not explicitly transmitted.

Resource elements not used for PCFICH, PHICH or reference signals in the control region may be used for transmission of the PDCCH. Additionally, or alternatively, in one implementation, each CCE may be mapped to span all of the OFDM symbols in the control region to provide an even power distribution between the OFDM symbols and to allow for power control.

Similar to the PCFICH, the transmission power of each PDCCH may be under the control of the eNodeB. In addition to adjusting the code rate, power adjustments may be used as a complimentary link adaptation mechanism. While power adjustments alone may be as a link adaptation mechanism, relying on power adjustments alone may result in relatively large power differences between PDCCHs, which may have implications from a radio frequency (RF) implementation perspective. In this regard, different code rates and power adjustments may be employed as complementary link adaptation mechanisms.

As described in connection with FIG. 9, each PDCCH may support multiple formats, and the format employed may a priori be unknown to the UE. Therefore, the UE may need to blindly detect the format of the PDCCHs. A requirement to monitor multiple PDCCHs, each with an unknown format, may appear to be a significantly high number of decoding attempts for the UE. However, if a fixed CCE size is employed, and only particular CCE aggregation sizes (e.g., one, two, four, or eight CCEs) are permitted, the number of blind decoding attempts may be reduced. FIG. 10 illustrates an exemplary blind PDCCH decoding scheme 1000 occurring in a UE.

The PHICH may be used for transmission of hybrid-ARQ acknowledgements in response to a UL-SCH transmission. There may be one PHICH present for each UE expecting an acknowledgement in a sub-frame.

FIG. 11 illustrates an exemplary PHICH processing scheme 1100. As illustrated, each PHICH may carry one bit, which may be repeated three times 1105, modulated 1110, spread with a spreading factor (e.g., four) 1115, and added 1120 to other PHICHs. That is, multiple PHICHs may form a PHICH group, and the PHICHs within a PHICH group may be code-multiplexed using, for example, different orthogonal spreading sequences, and the PHICH group may share the same set of resource elements. Employing code division multiplexing (CDM), a power difference between subcarriers may not be as large as with frequency division multiplexing (FDM). If more PHICH capacity within a single PHICH group (e.g., corresponding to 12 resource elements) is desired, additional PHICH groups may be configured. Within each PHICH group, CDM may be used, while FDM may be used between the PHICH groups. After adding other PHICHs, PHICHs may be scrambled 1125, and mapped to three groups of three resource elements each in the control region 1130.

The power setting of the PHICH, and consequently the PHICH error rate, may not be specified but may be considered an implementation issue. However, 3GPP assumes that an ACK-to-NAK error rate of 10^-2 and an NAK-to-ACK error rate in the range of 10^-3 to 10^-4 may be an appropriate LTE design. The reason is that an NAK-to-ACK error may imply a loss of a transport block at the MAC level. This loss would have to be recovered by radio link control (RLC) retransmissions having associated delays. As the PHICH target error rates are lower than the PHICH error rates, the PHICH mapping may be designed not to be dependent on the PCFICH value. Therefore, a semi-static configuration may be used to reserve resources for the PHICH.

The PHICH may be transmitted in the first OFDM symbol only. However, in other instances, such an approach may unnecessarily restrict the PHICH coverage. In this regard, other approaches may encompass configuring PHICH duration of, for example, three OFDM symbols. In this instance, the control region may be three OFDM symbols long in all sub-frames. However, in other instances, the PHICH duration may be more or less. For example, in the case of a mixed unicast/MBSFN sub-frame, the PHICH duration may be two OFDM symbols.

The PHICH configuration may be part of the system information (e.g., Master Information Block (MIB) on the broadcast channel (BCH)). One bit may indicate whether the duration is, for example, one or three OFDM symbols, and two bits may indicate the amount of resources set aside for the PHICHs. There may be no explicit indication in a scheduling grant from which the UE may expect an acknowledgement. Instead, the PHICH number used for transmission of the acknowledgement may be derived from the number of the first CCE of the PDCCH carrying the grant.

Within the LTE design, multimedia broadcast/multicast services (MBMS) may be provided. For example, a single-cell point to multipoint transmission and/or a multi-cell single-frequency-network operation (also referred to as MBSFN) may be employed. In a MBSFN, the same broadcast/multicast information may be synchronously transmitted from a group of cells using the same resource (e.g., the same set of resource blocks) and/or the same transport format (e.g., the same coding rate and/or modulation scheme) in all cells. In instances of such a MBSFN transmission, the signals transmitted from the different cells that arrive at the UE with a time difference within a span of the CP, may be seen by the UE as a single aggregate signal. In this regard, the use of a MBSFN transmission may increase the received signal power and/or eliminate a significant part of inter-cell interference. As a result, the possible throughput for MBMS may be significantly improved.

In the LTE framework, a MBSFN transmission may take place in specific sub-frames referred to as MBSFN sub-frames. Different fractions of the overall set of downlink sub-frames may be assigned as MBSFN sub-frames, depending on, for example, an amount of MBMS capacity needed. However, typically, sub-frame #0 and sub-frame #5 of a frame are non-MBSFN sub-frames (though not necessarily valid in case of a so-called dedicated MBSFN carrier).

FIG. 12 illustrates an exemplary MBSFN sub-frame architecture 1200. As illustrated, a MBSFN sub-frame 1205 may include two parts; a unicast part 1210 and a MBSFN part 1215.

Unicast part 1210 may include one or two OFDM symbols. Within unicast part 1210, L1/L2 control part 1220 signaling may be transmitted (i.e., of a PCFICH, a PHICH, and/or a PDCCH). The transmission of such control signaling in MBSFN sub-frame 1205 may be needed to support transmission in the uplink direction (e.g., PHICH for hybrid automatic repeat-request (HARD) acknowledgements, PDCCH for uplink scheduling grants, and/or uplink power control). The length of unicast part 1210 may be semi-statically configured to provide that it is the same for all cells involved in the MBSFN transmission. However, this may be in contrast to the L1/L2-control part 1220 of a non-MBSFN sub-frame, where the length may be dynamically varied (e.g., on a sub-frame by sub-frame basis), and may be signaled on the PCFICH. Nonetheless, there still may be a PCFICH also in MBSFN sub-frame 1205.

MBSFN part 1215 may provide for the remaining portion of MBSFN sub-frame 1205, and where the coded map control header (MCH) may be transmitted. Within MBSFN sub-frame 1205, a different CP (e.g., the extended CP) may be employed. Unicast part 1210 of MBSFN sub-frame 1205 may use the same CP as the non-MBSFN sub-frames. This CP may be different than the CP used for the remaining part of MBSFN sub-frame 1205.

In MBSFN sub-frames 1205, cell-specific unicast reference symbols are transmitted within the first OFDM symbol (and the second OFDM symbol in case of four transmit antennas) of the first slot of MBSFN sub-frames 1205. Additionally, within MBSFN sub-frames 1205, additional MBSFN reference symbols may be transmitted within MBSFN part 1215 of MBSFN sub-frames 1205. The position and the reference signal sequence of these reference symbols may be the same for all cells involved in the MBSFN transmission. These MBSFN reference symbols may allow for estimation of the aggregated channel of all cells involved in the MBSFN transmission.

It will be appreciated that in the LTE framework, a MBSFN transmission on a mixed carrier and a MBSFN transmission on a dedicated carrier may be distinguishable. A MBSFN transmission on a mixed carrier implies that the MBFSN transmission is carried out in parallel with normal unicast traffic (i.e., in different sub-frames) on the same carrier. A MBSFN transmission on a dedicated carrier implies that the MBSFN transmission is carried out on a carrier dedicated to MBSFN transmission (i.e., there is no other unicast transmission on such a carrier). In this regard, an MBSFN dedicated carrier may be assumed to have no corresponding uplink carrier, and thus no need for any unicast control region within the sub-frames for a MBSFN dedicated carrier.

As described above, the E-UTRAN standard supports four antenna ports for cell-specific or common reference signals and one antenna port for dedicated reference signals. In this regard, the E-UTRAN standard sets forth limitations that stifle further expansion. For example, there may be a need for additional reference signals to distinguish more antenna ports than currently supported by the E-UTRAN standard. Additionally, or alternatively, there may be a need to introduce new types of signals into the E-UTRAN standard to support future applications. It would also be desirable to introduce these forms of enhanced signals without affecting legacy equipment.

SUMMARY

It is an object to obviate at least some of the above disadvantages and to improve the operability of devices within a network.

According to one aspect, a method may be performed in a wireless network having a wireless station that may be capable of supporting a legacy terminal and a non-legacy terminal, and may be performed by the wireless station, and may be characterized by generating an enhanced signal that provides a function not supported in a communication standard corresponding to a specification of the legacy terminal, and where the function is supported by the non-legacy terminal, providing the enhanced signaling to a downlink transmitter, and transmitting the enhanced signal according to the communication standard using a channel of the communication standard and transmitting the enhanced signal in a manner that the legacy terminal is unable to detect a presence of the enhanced signal.

According to another aspect, a method may be performed in a wireless network, and may be performed by a legacy terminal and a non-legacy terminal, and may be characterized by receiving an enhanced signal that provides a function not supported in a communication standard corresponding to a specification of the legacy terminal, and where the enhanced signal provides a function supported in a communication standard corresponding to a specification of the non-legacy terminal, and determining whether the enhanced signal can be processed.

According to yet another aspect, a wireless station in a wireless environment, the wireless station may be capable of serving a legacy terminal and a non-legacy terminal, and may be characterized by one or more antennas and a processing system. The processing system may generate an enhanced signal that provides a function not supported in a communication standard corresponding to a specification of the legacy terminal, and where the enhanced signal provides a function capable of being performed by the non-legacy terminal, provide the enhanced signal to the one or more antennas, and transmit the enhanced signal according to a channel structure of the communication standard and in a manner that the legacy terminal is incapable of detecting a presence of the enhanced signal.

According to still another aspect, a non-legacy mobile terminal in a wireless environment may be characterized by one or more antennas, and a processing system to receive an enhanced signal, the enhanced signal including a function that a legacy terminal is incapable of performing, where the legacy terminal operates according to a communication standard, and the non-legacy terminal operates according to an enhanced version of the communication standard, and where the enhanced signal is received by the non-legacy mobile terminal in a format of the communication standard, and where the processing system performs the function.

DETAILED DESCRIPTION

The following detailed description refers to the accompanying drawings. The same reference numbers in different drawings may identify the same or similar elements. Also, the following description does not limit the invention.

The concepts described herein relate to a wireless communication network. A wireless communication network is intended to be broadly interpreted to include cellular networks (e.g., Global System for Mobile Communications (GSM), Universal Mobile Telecommunications Systems (UMTS), LTE, Code Division Multiple Access 2000 (CDMA2000), Ultra Mobile Broadband (UMB), etc.), and non-cellular networks (e.g., Wireless Fidelity (Wi-Fi), Worldwide Interoperability for Microwave Access (WiMax), etc.). In this regard, while the detailed description to follow may refer to a particular architecture (e.g., a network architecture or a device architecture), coding scheme, multiplexing scheme, format, protocol, etc., the concepts described herein should not be construed as being dependent on such an architecture, coding scheme, multiplexing scheme, format, protocol, etc. Rather, it will be appreciated that the concepts described herein are not platform dependent and may be implemented within a wide variety of architectures, coding schemes, multiplexing schemes, formats, protocols, etc., in addition to those specifically mentioned herein. The term "standard," as used herein, is intended to be broadly interpreted to include any communication standard (e.g., LTE, GSM, etc.) and/or a version thereof.

Figure 13:
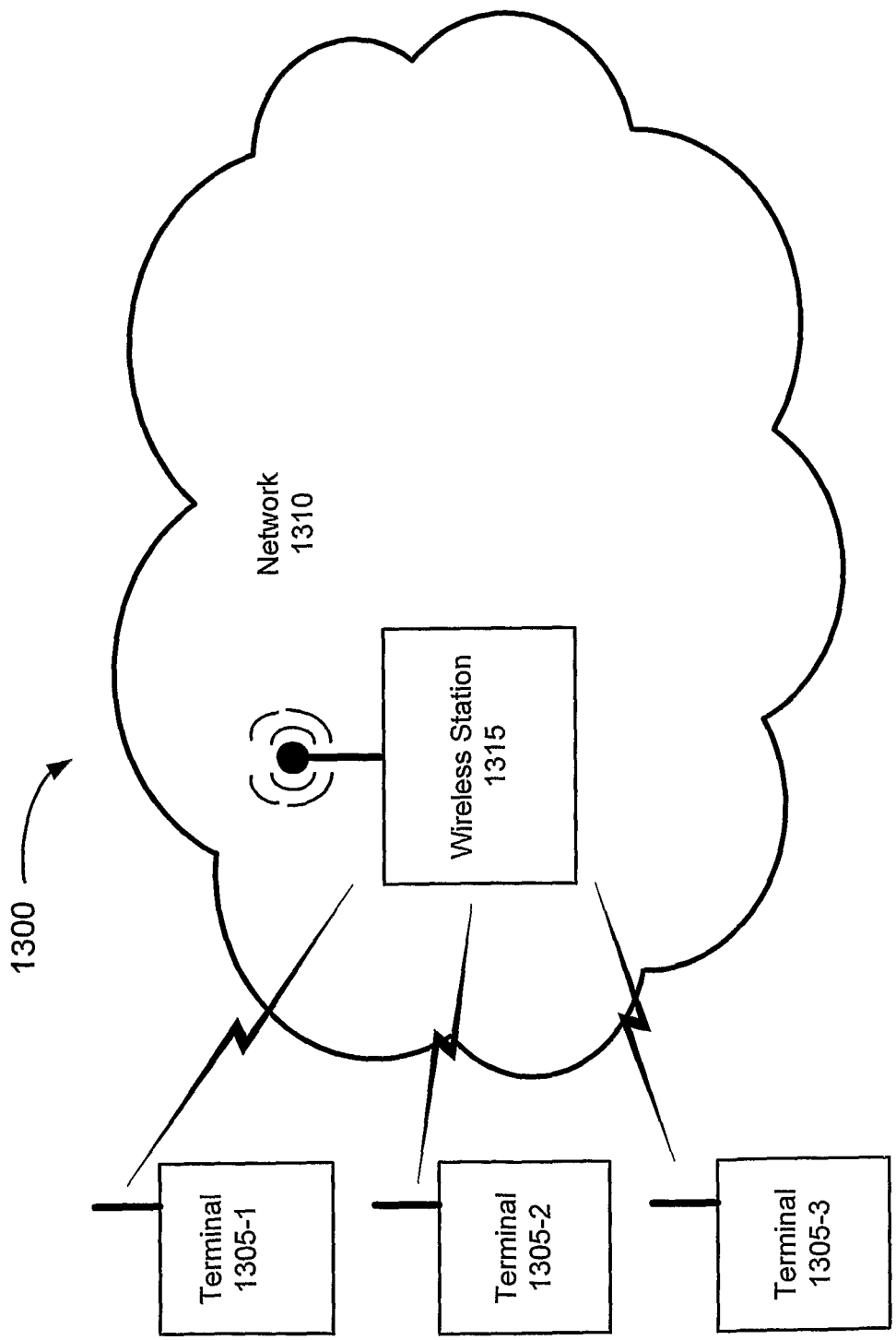
FIG. 13 is a diagram illustrating an exemplary wireless environment.

FIG. 13 is a diagram of an exemplary wireless environment 1300. As illustrated, environment 1300 may include, among other devices, terminals 1305-1, 1305-2, and 1305-3 (collectively referred to as terminal 1305), network 1310, and wireless station 1315. In practice, the number of terminals 1305 and/or the number of wireless station 1315 may be different.

Terminal 1305 may include a mobile terminal by which a user may access services by maintaining a communication link with wireless station 1315. Terminal 1305 may include, for example, a mobile phone, a personal digital assistant (PDA), a mobile computer, a laptop, a gaming device, a music playing device, a video playing device, a web browsing device, and/or another type of handset or communication device.

Network 1310 may include any type of network, such as a wide area network (WAN), a local area network (LAN), a public switched telephone network (PSTN), the Internet, a private network, or a combination of networks. Network 1310 may provide services and/or resources to a user of terminal 1305.

Wireless station 1315 may include a device that handles wireless transmissions to and from terminal 1305 to provide access to network 1310. For example, wireless station 1315 may include a base station, such as a base transceiver station (BTS) in a GSM system, eNodeB in a LTE system, a Node B in a UMTS system, etc. Additionally, or alternatively, wireless station 1315 may include a device for amplifying a signal, coding/decoding a signal and/or forwarding a signal (e.g., a repeater or a relay). Additionally, or alternatively, wireless station 1315 may include a device for attaching and/or inserting an additional signal or information to a signal before forwarding, amplifying, and/or decoding it. In this regard, wireless station 1315 is intended to be broadly interpreted to include any type of node that may perform one or more operations in accordance with a wireless environment.

Although FIG. 13 illustrates an exemplary wireless environment 1300, in other implementations, fewer, additional, or different devices may be employed. For example, wireless environment may include base station controllers, access gateway devices, etc.

Figure 14:
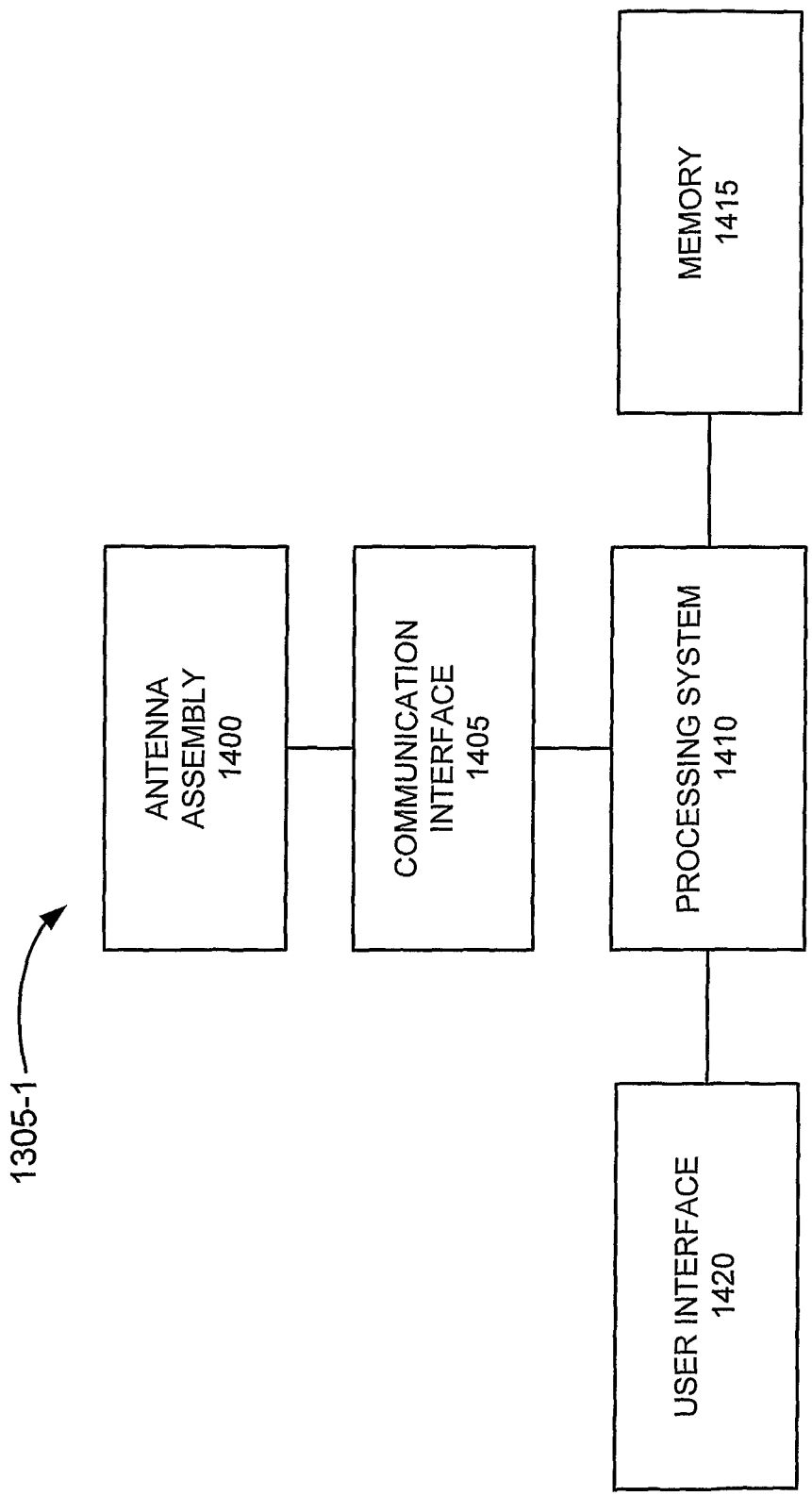
FIG. 14 is a diagram illustrating exemplary components that may correspond to the terminals depicted in FIG. 13.

FIG. 14 is a diagram illustrating exemplary components that may be associated with terminal 1305-1. Terminal 1305-2 and 1305-3 may be similarly configured. The term "component," as used herein, is intended to be broadly interpreted to include software, hardware, or a combination of hardware and software. As illustrated, terminal 1305 may include an antenna assembly 1400, a communication interface 1405, a processing system 1410, a memory 1415, and a user interface 1420.

Antenna assembly 1400 may include one or more antennas to transmit and receive wireless signals over the air. Communication interface 1405 may include, for example, a transmitter that may convert baseband signals from processing system 1410 to radio frequency (RF) signals and/or a receiver that may convert received RF signals to baseband signals for use by processing system 1410.

Processing system 1410 may control the operation of terminal 1305-1. For example, processing system 1410 may include a general purpose processor, a microprocessor, a data processor, a co-processor, a network processor, an application specific integrated circuit (ASIC), a controller, a programmable logic device, a chipset, a field programmable gate array, or any other component or group of components that may interpret and execute instructions.

Memory 1415 may include any type of device that stores data and instructions related to the operation and use of terminal 1305-1. For example, memory 1415 may include a random access memory (RAM), a dynamic random access memory (DRAM), a static random access memory (SRAM), a read only memory (ROM), a programmable read only memory (PROM), and/or a flash memory.

User interface 1420 may include a device for inputting information to terminal 1305-1 and/or for outputting information from terminal 1305-1. Examples of input and output devices may include a speaker, a microphone, control buttons, a keypad, a display, and/or a vibrator to cause terminal 1305-1 to vibrate.

Although FIG. 14 illustrates exemplary components of terminal 1305-1, in other implementations, terminal 1305-1 may include fewer, additional, and/or different components than the components illustrated in FIG. 14. Additionally, or alternatively, one or more components of terminal 1305-1 may be a component of a device other than terminal 1305-1.

Figure 15:
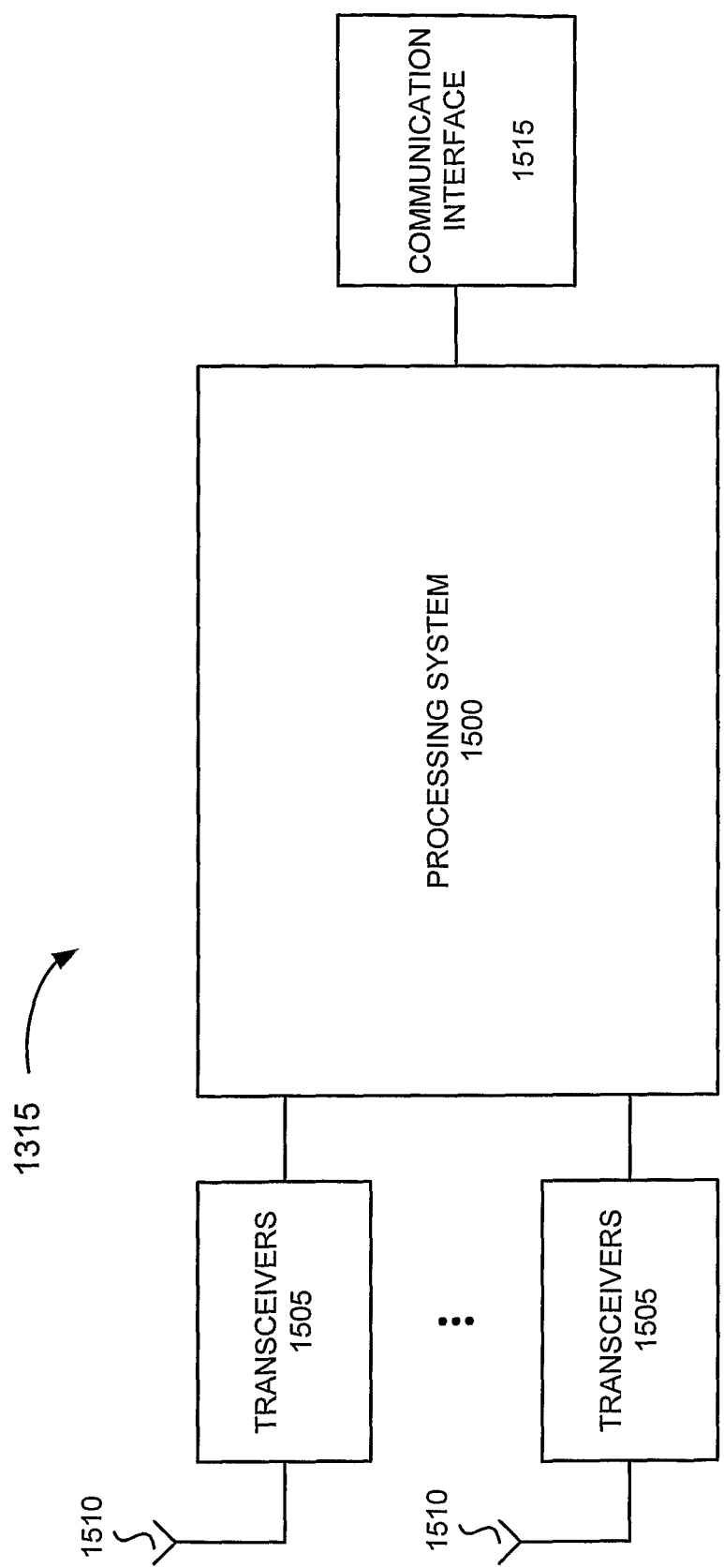
FIG. 15 is a diagram illustrating exemplary components that may correspond to the wireless station depicted in FIG. 14.

FIG. 15 is a diagram illustrating exemplary components that may be associated with wireless station 1315. As illustrated, wireless station 1315 may include processing system 1500, transceivers 1505, antennas 1510, and communication interface 1515.

Processing system 1500 may control the operation of wireless station 1315. For example, processing system 1500 may include a general purpose processor, a microprocessor, a data processor, a co-processor, a network processor, an application specific integrated circuit (ASIC), a controller, a programmable logic device, a chipset, a field programmable gate array, or any other component or group of components that may interpret and execute instructions. Processing system 1500 may include memory and storage devices.

Transceivers 1505 may be associated with antennas 1505 and may include transceiver circuitry for transmitting and/or receiving signals in a network, such as network 1310, via antennas 1510. Antennas 1510 may include one or more directional and/or omni-directional antennas.

Communication interface 1515 may include any transceiver-like device that enables wireless station 1315 to communicate with other devices and/or systems. For example, communication interface 1515 may include a radio interface, an optical interface, an Ethernet interface, a coaxial interface, or some other type of interface for wired or wireless communication. Communication interface 1515 may include a group of communication interfaces to handle multiple traffic flows.

Although FIG. 15 illustrates exemplary components of wireless station 1315, in other implementations, wireless station 1315 may include fewer, additional, and/or different components than the components illustrated in FIG. 15. Additionally, or alternatively, one or more components of wireless station 1315 may be a component of a device other than wireless station 1315.

As previously described above, a standard, such as E-UTRAN, may provide a framework that imposes certain limitations (e.g., in terms of device operability, functionality, etc.). The concepts described herein provide for various mechanisms to overcome these limitations by introducing enhanced signals within a standard without impacting legacy devices that align with the standard, and permitting new functions, services, applications, etc., to be performed by non-legacy devices.

For purposes of discussion with respect to FIGS. 16-19 described below, assume that terminal 1305-1 corresponds to a non-legacy terminal, while terminals 1305-2 and 1305-3 correspond to legacy terminals. The term "legacy terminal," as used herein, is intended to correspond to a terminal that may operate according to a standard, but is incapable of processing and/or performing a function associated with an enhanced signal. Conversely, the term "non-legacy terminal," as used herein, is intended to correspond to a terminal that may operate according to an enhanced version of the standard and is capable of processing and/or performing the function associated with the enhanced signal.

FIGS. 16-19 are flow charts illustrating exemplary processes for introducing enhanced signals into a wireless environment, such as environment 1300. The term "enhanced signal," as used herein, is intended to be broadly interpreted to include a signal that provides functionality not otherwise permitted (i.e., possible) according to a particular standard. The enhanced signal may include a type of signal specified within a standard (e.g., a control signal, such as a reference signal) that provides a function that is recognizable and useful to a non-legacy terminal, such as terminal 1305-1. Additionally, or alternatively, the enhanced signal may include a new type of signal that is not specified within a standard to support other applications. For example, a new type of signal may be utilized for an additional broadcast channel (i.e., a broadcast channel that is in addition to broadcast channels already specified in the standard) that provides a function that is recognizable and useful to non-legacy terminal 1305-1.

Figure 16:
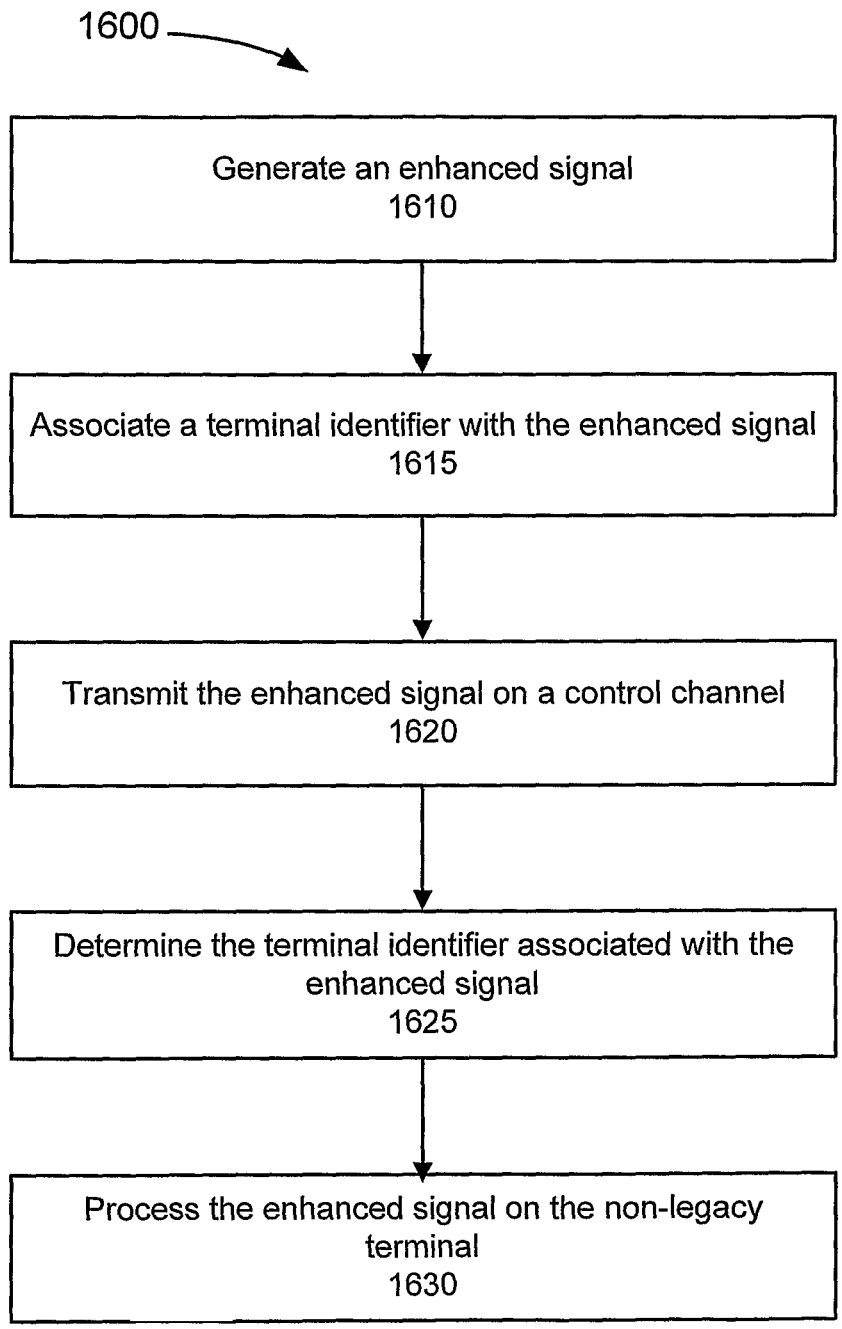
FIGS. 16-19 are flow diagrams related to processes associated with the concepts described herein.

FIG. 16 is a flow diagram illustrating an exemplary process 1600 that may be employed for introducing enhanced signaling on a control channel. For purposes of discussion, assume that wireless station 1315 recognizes terminal 1305-1 as being a non-legacy terminal. For example, wireless station 1315 may determine and/or distinguish that terminal 1305-1 is a non-legacy terminal during connection establishment processes.

Process 1600 may begin with generating an enhanced signal (block 1610). For example, wireless station 1315 may generate an enhanced signal. In one implementation, the enhanced signal may include a control signal. The control signal may relate to channel estimation, cell search, cell acquisition, synchronization, power control, a reference signal, a pilot signal, etc. In one implementation, the enhanced signal may correspond to a reference signal of an enhanced version of the E-UTRAN standard.

Figure 1:
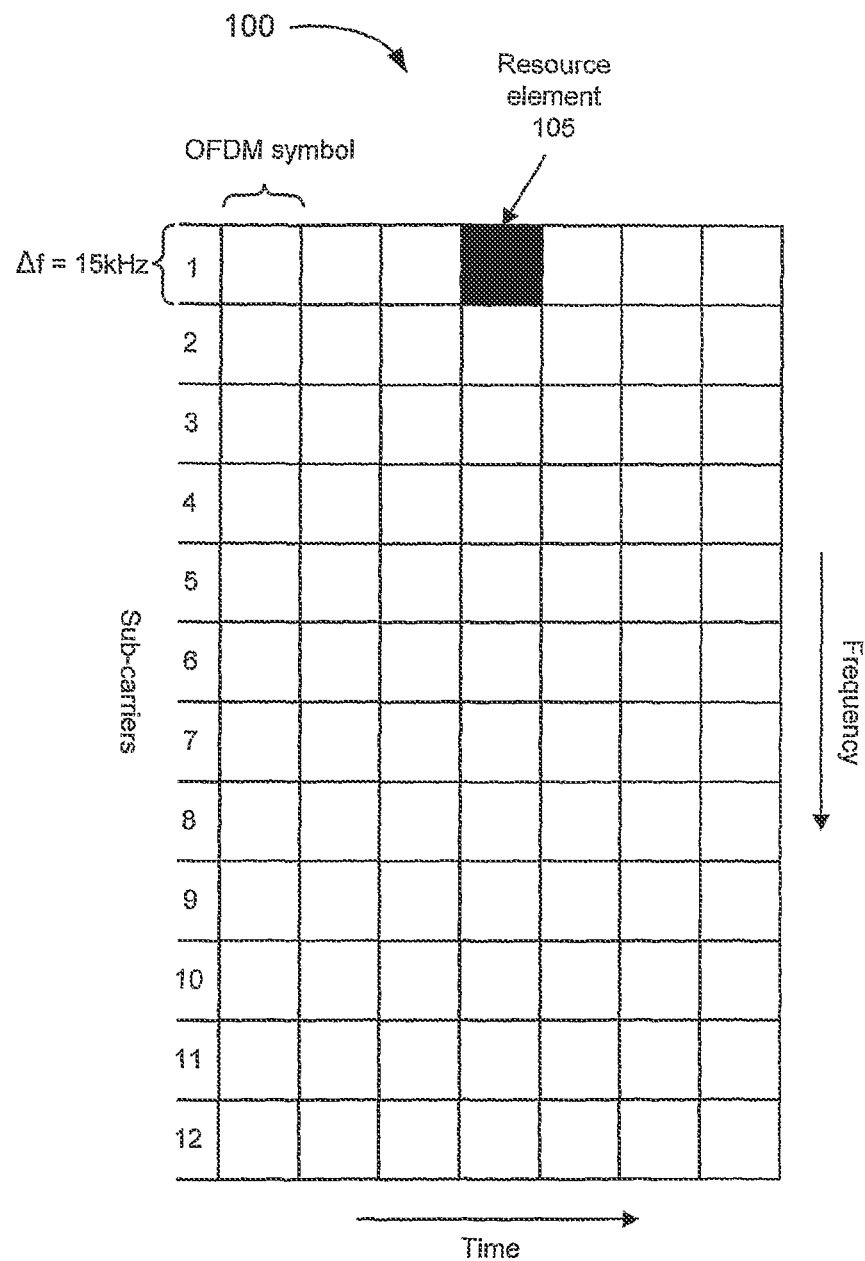
FIG. 1. is a diagram illustrating an exemplary OFDM time-frequency grid.
Figure 2:
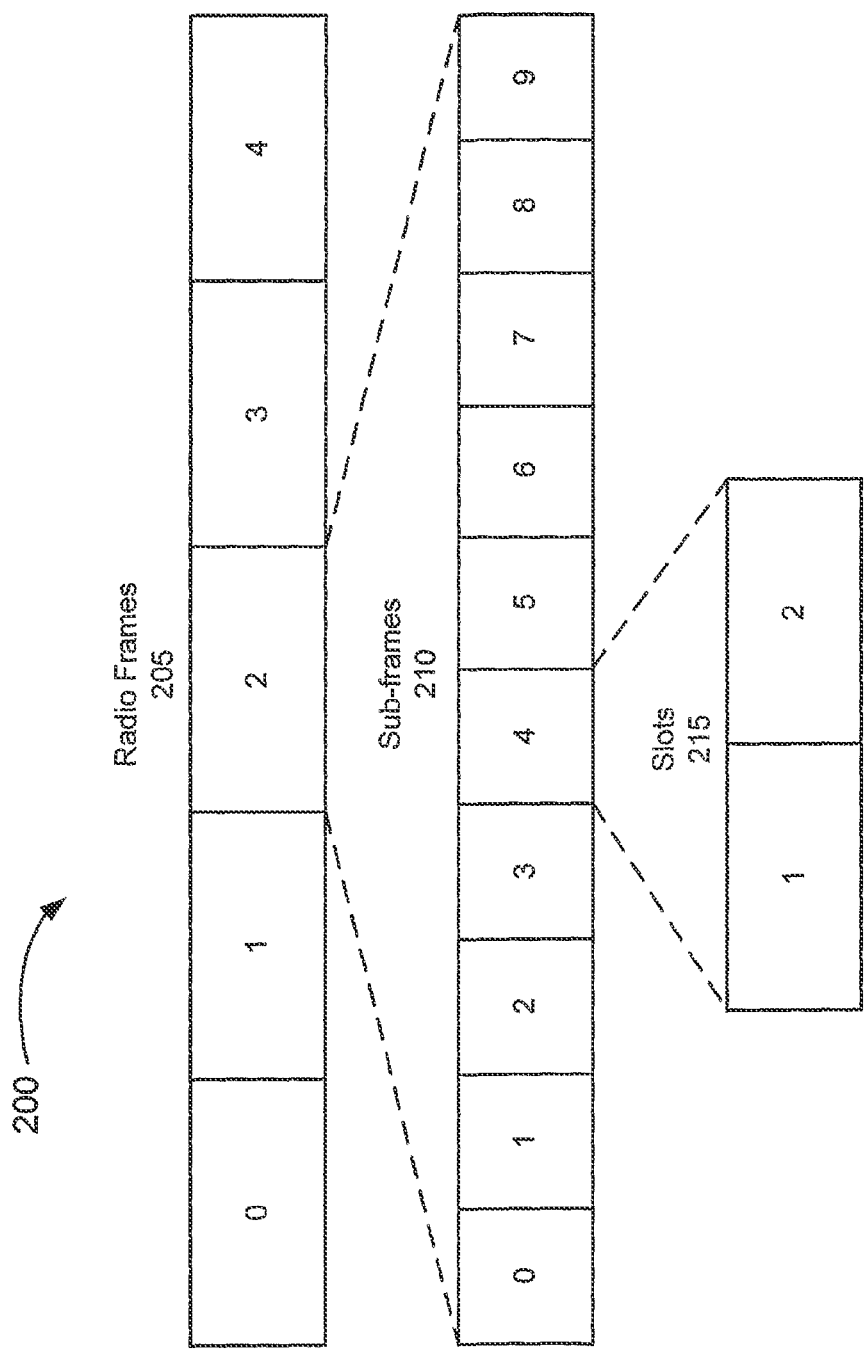
FIG. 2 is a diagram illustrating an exemplary radio frame and its sub-components.
Figure 3:
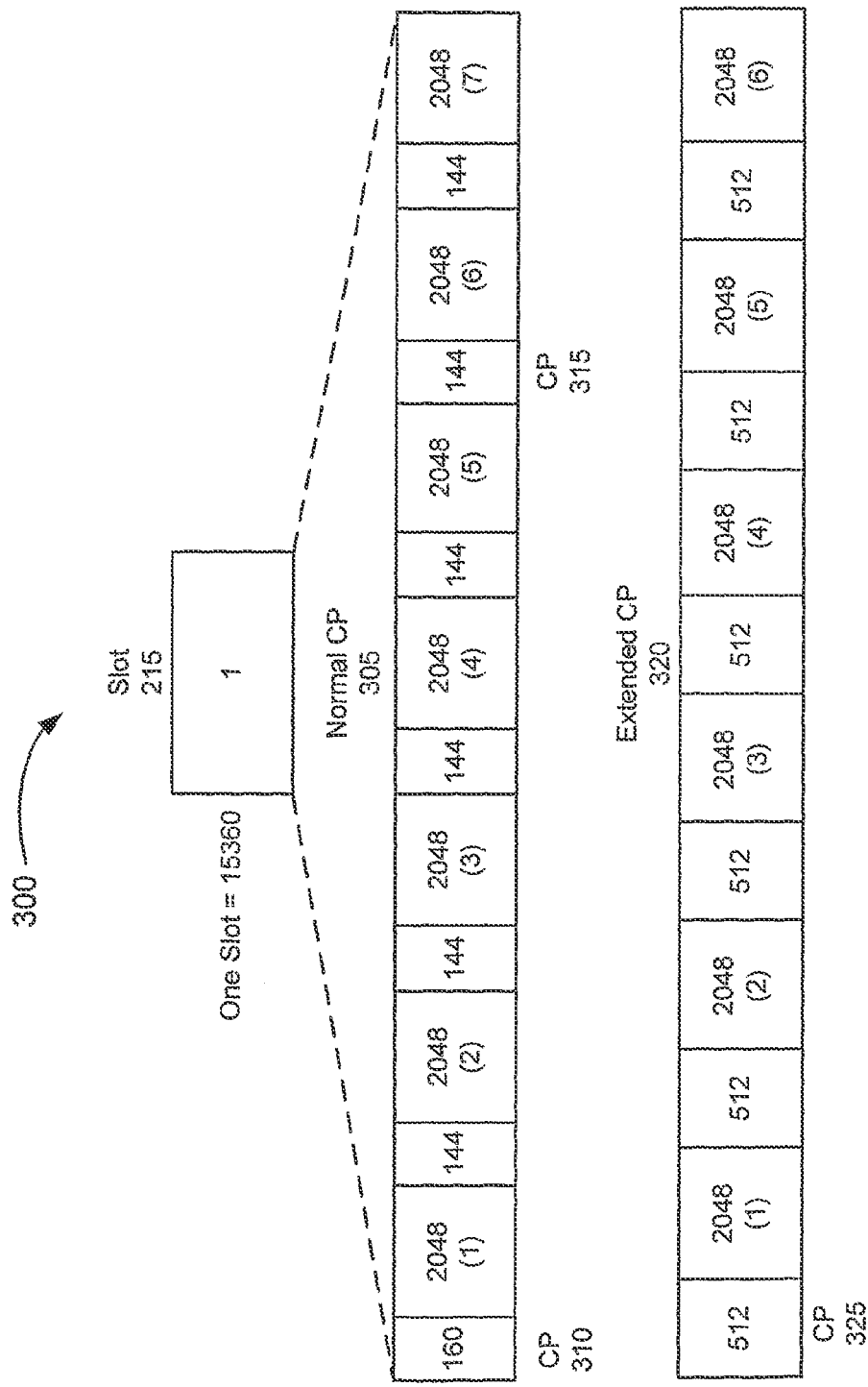
FIG. 3 is a diagram illustrating exemplary slots that may be associated with the exemplary radio frame depicted in FIG. 2.
Figure 4:
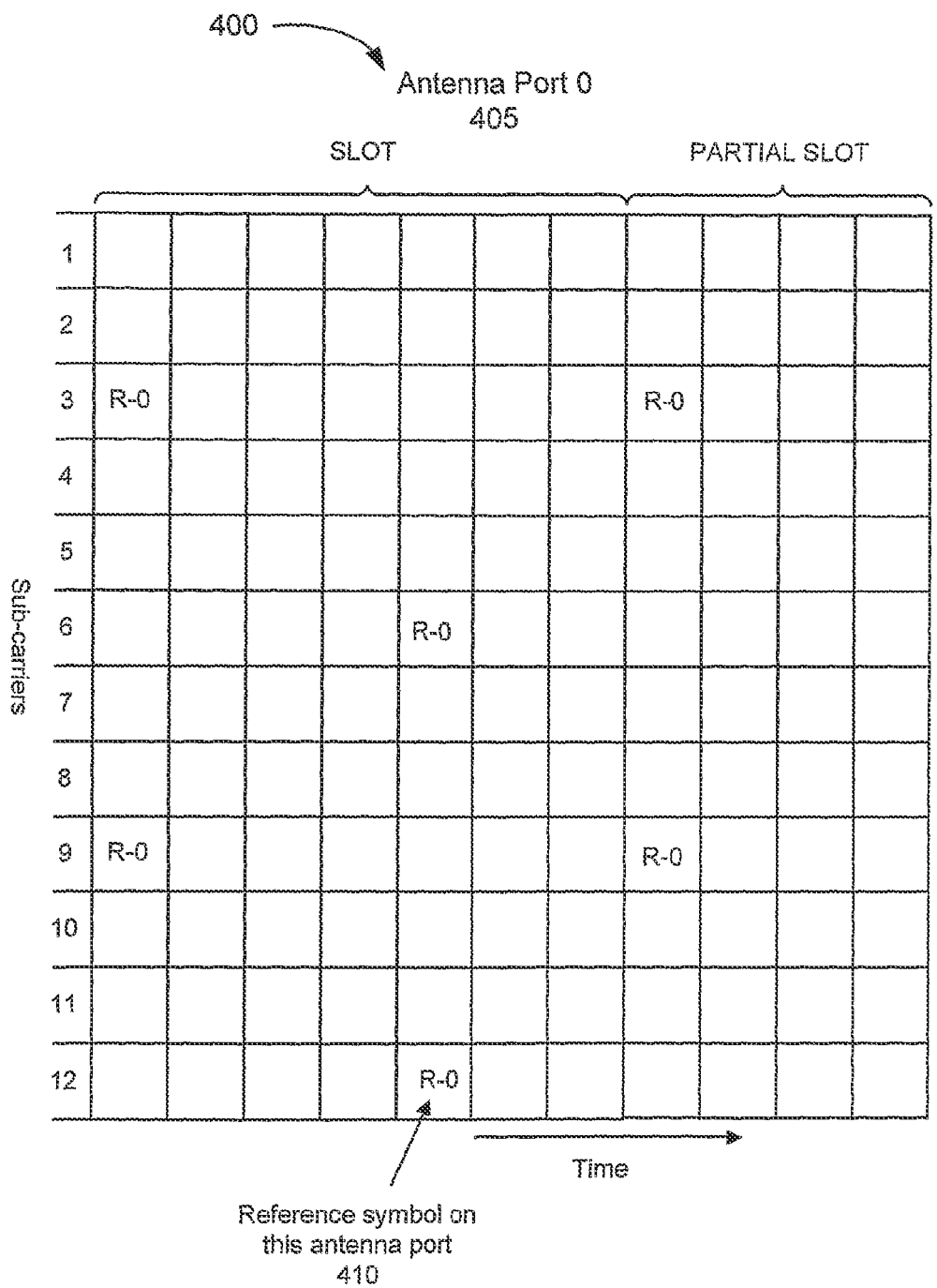
FIG. 4 is a diagram illustrating an exemplary OFDM time-frequency grid that may be associated with a single antenna port system.
Figure 5A:
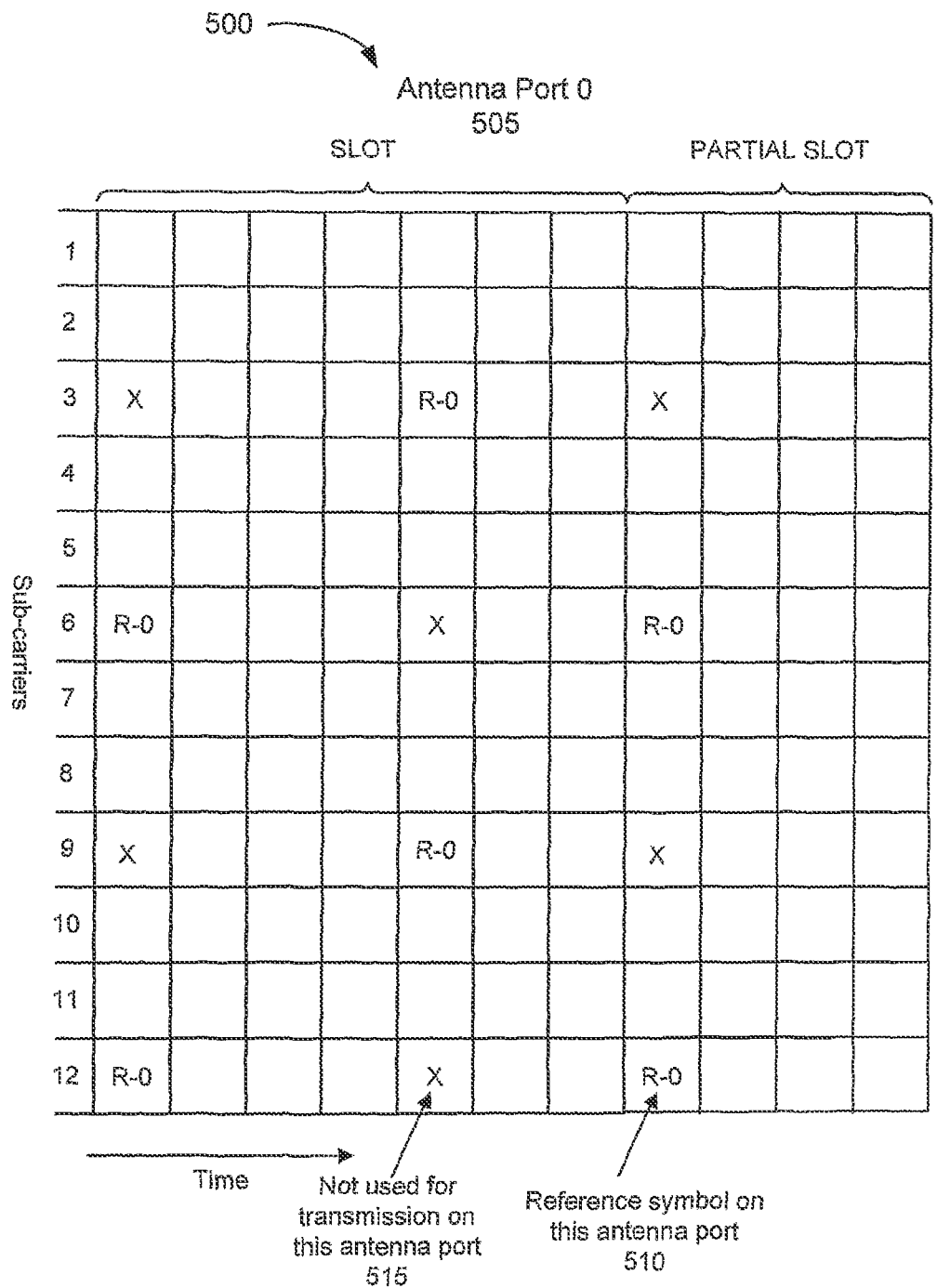
FIGS. 5A-5B are diagrams illustrating exemplary OFDM time-frequency grids that may be associated with a two antenna port system.
Figure 5B:
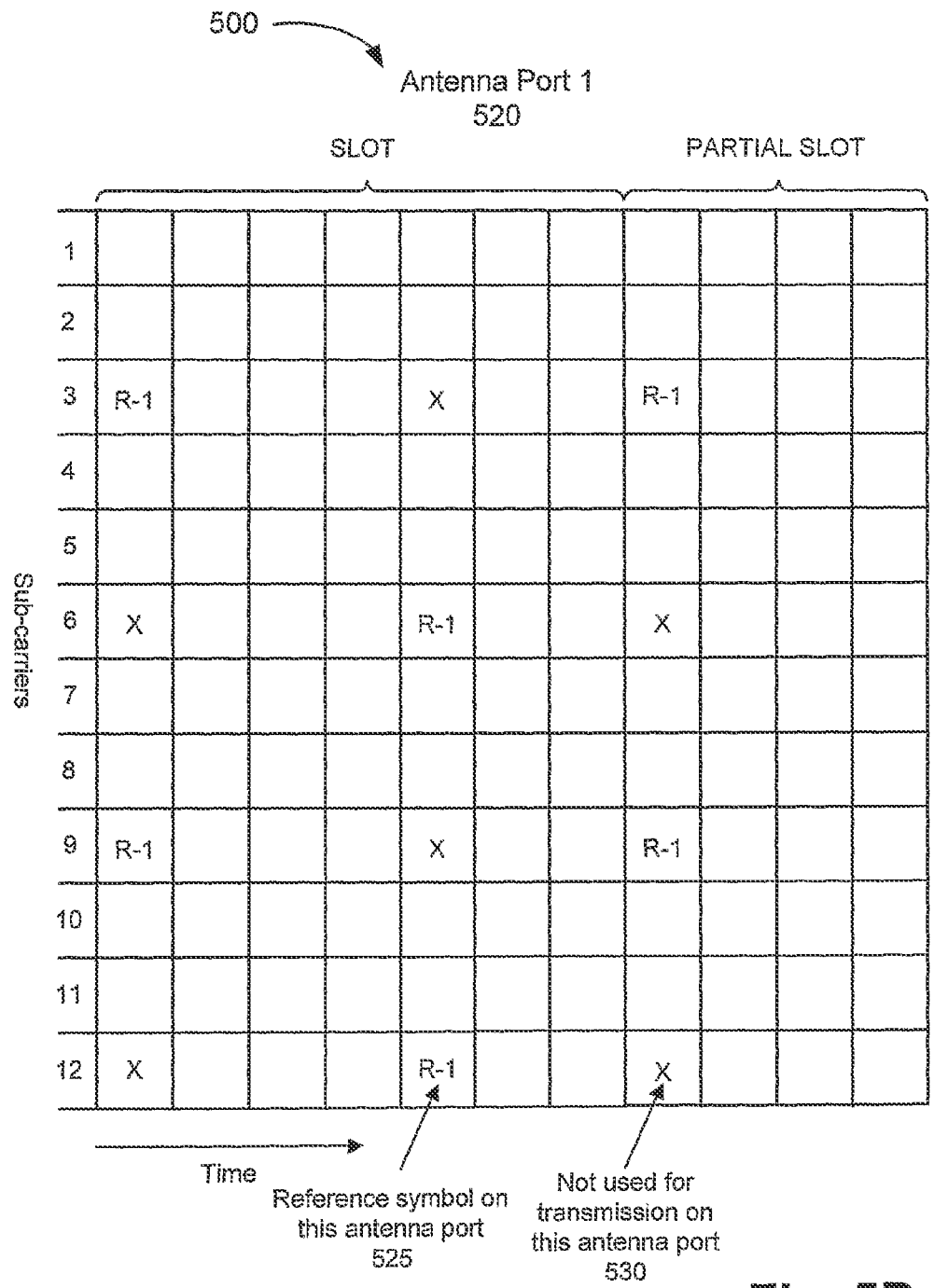
Figure 6A:
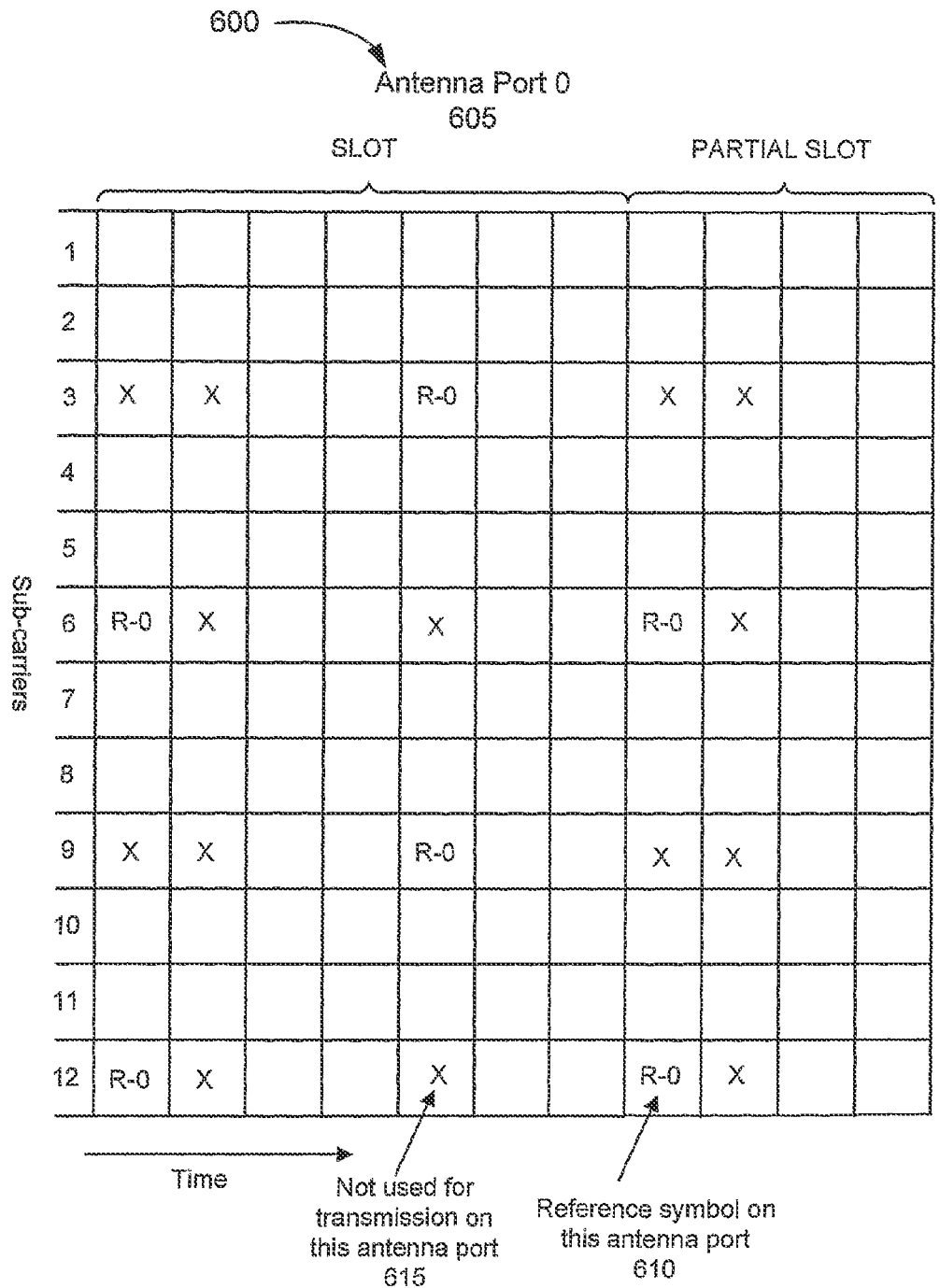
FIGS. 6A-6D are diagrams illustrating exemplary OFDM time-frequency grids that may be associated with a four antenna port system.
Figure 6B:
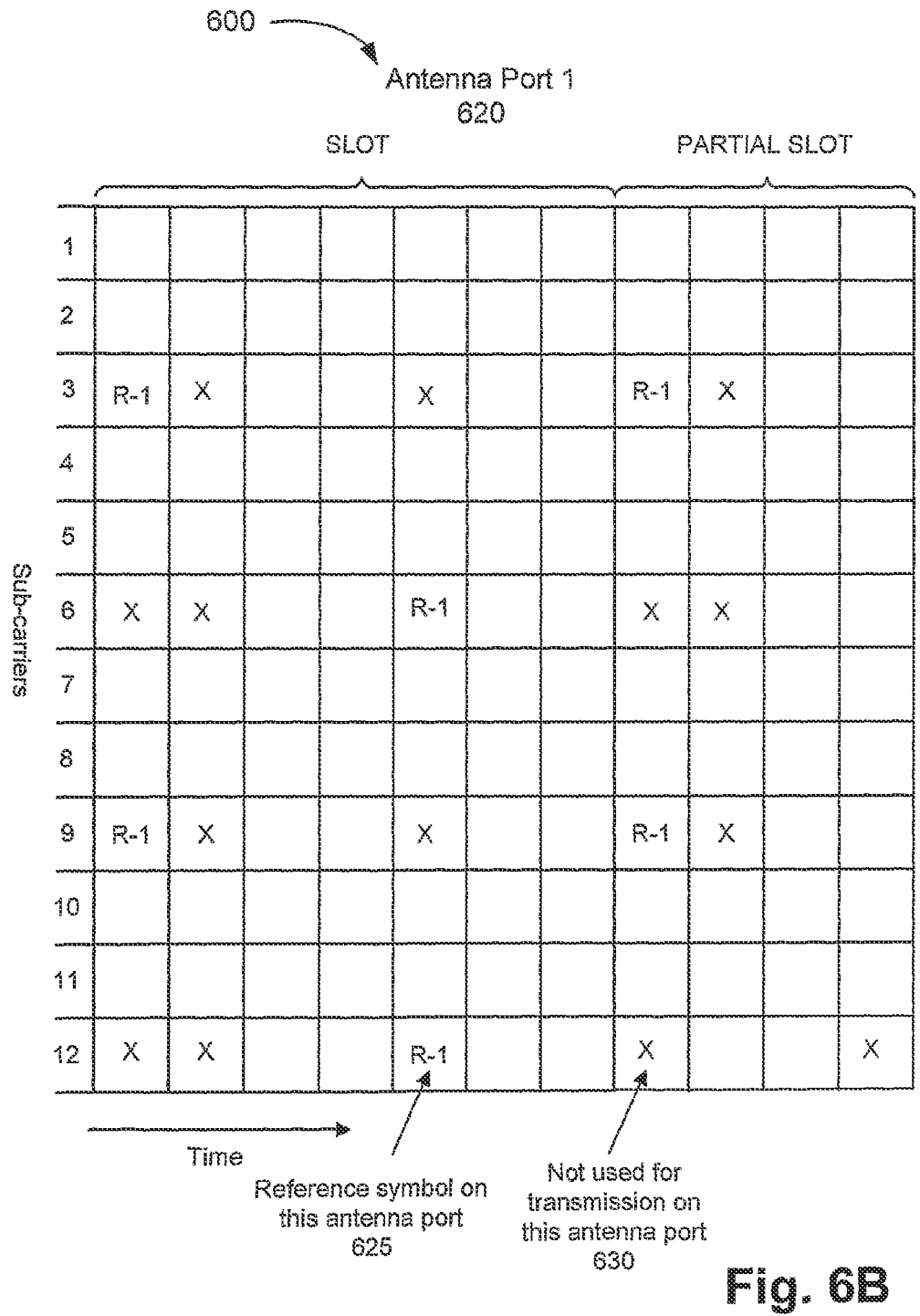
Figure 6C:
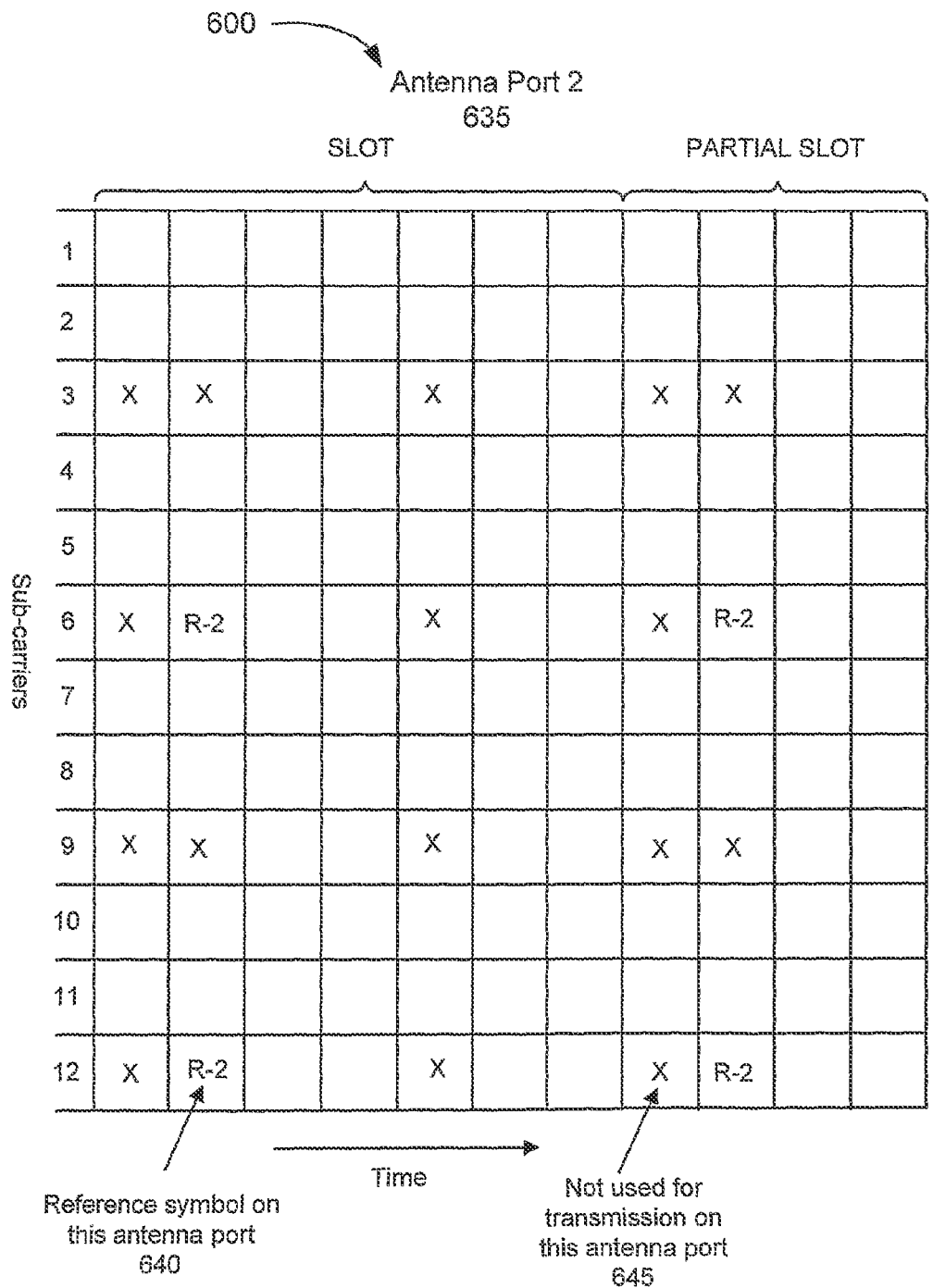
Figure 6D:
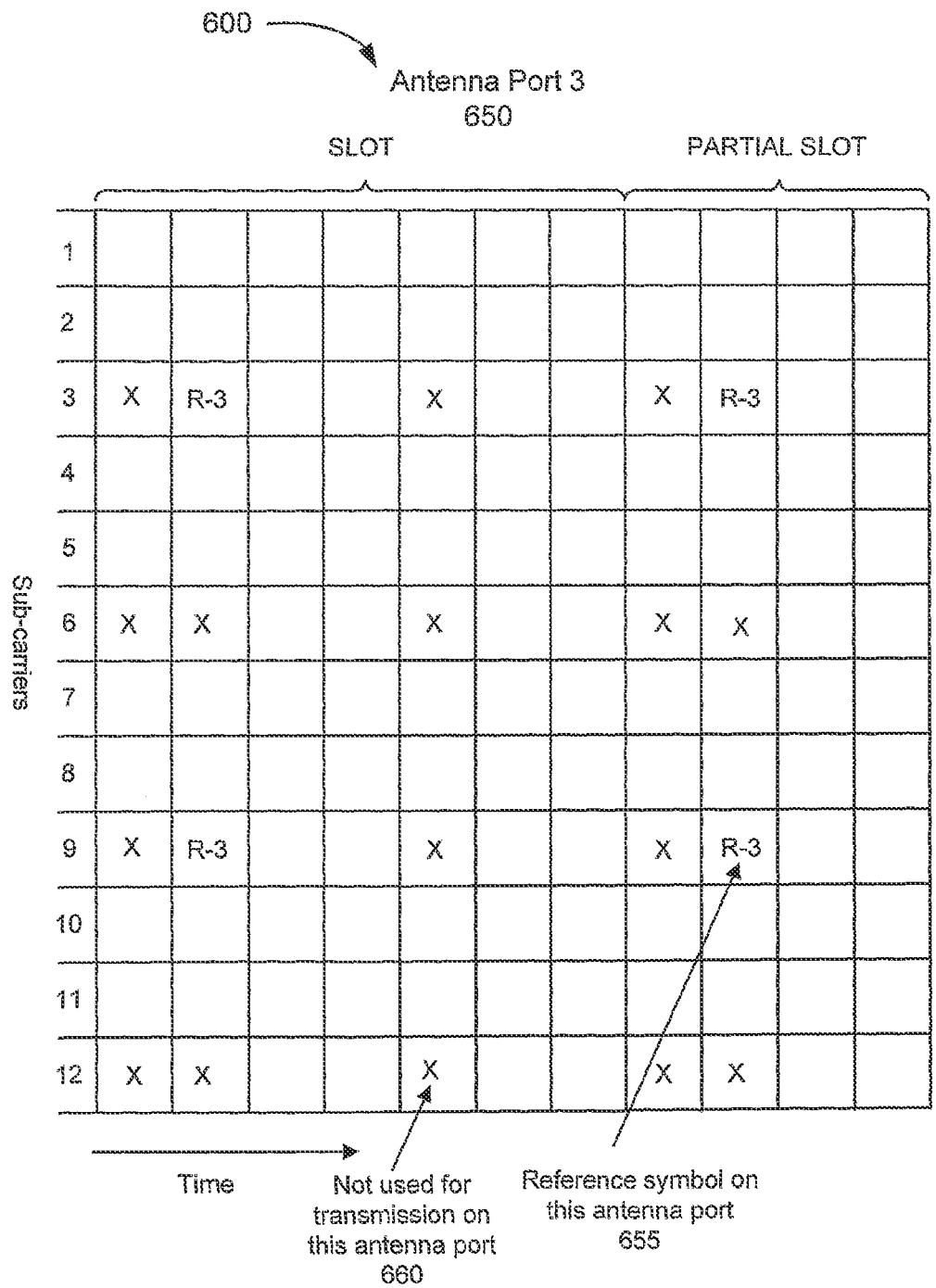
Figure 7:
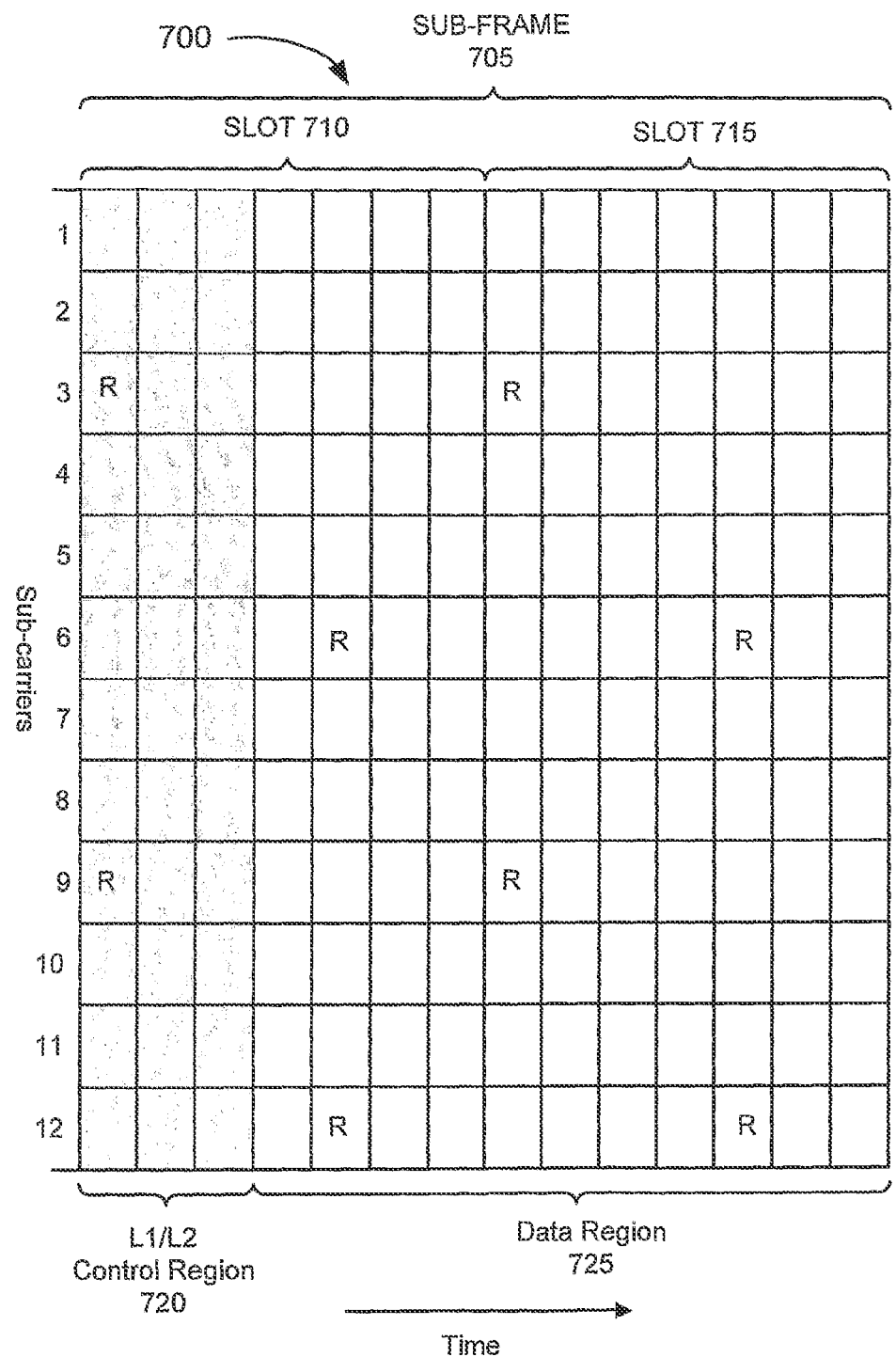
FIG. 7 is a diagram illustrating an exemplary control region of a sub-frame that may be associated with the exemplary radio frame depicted in FIG. 2.
Figure 8:
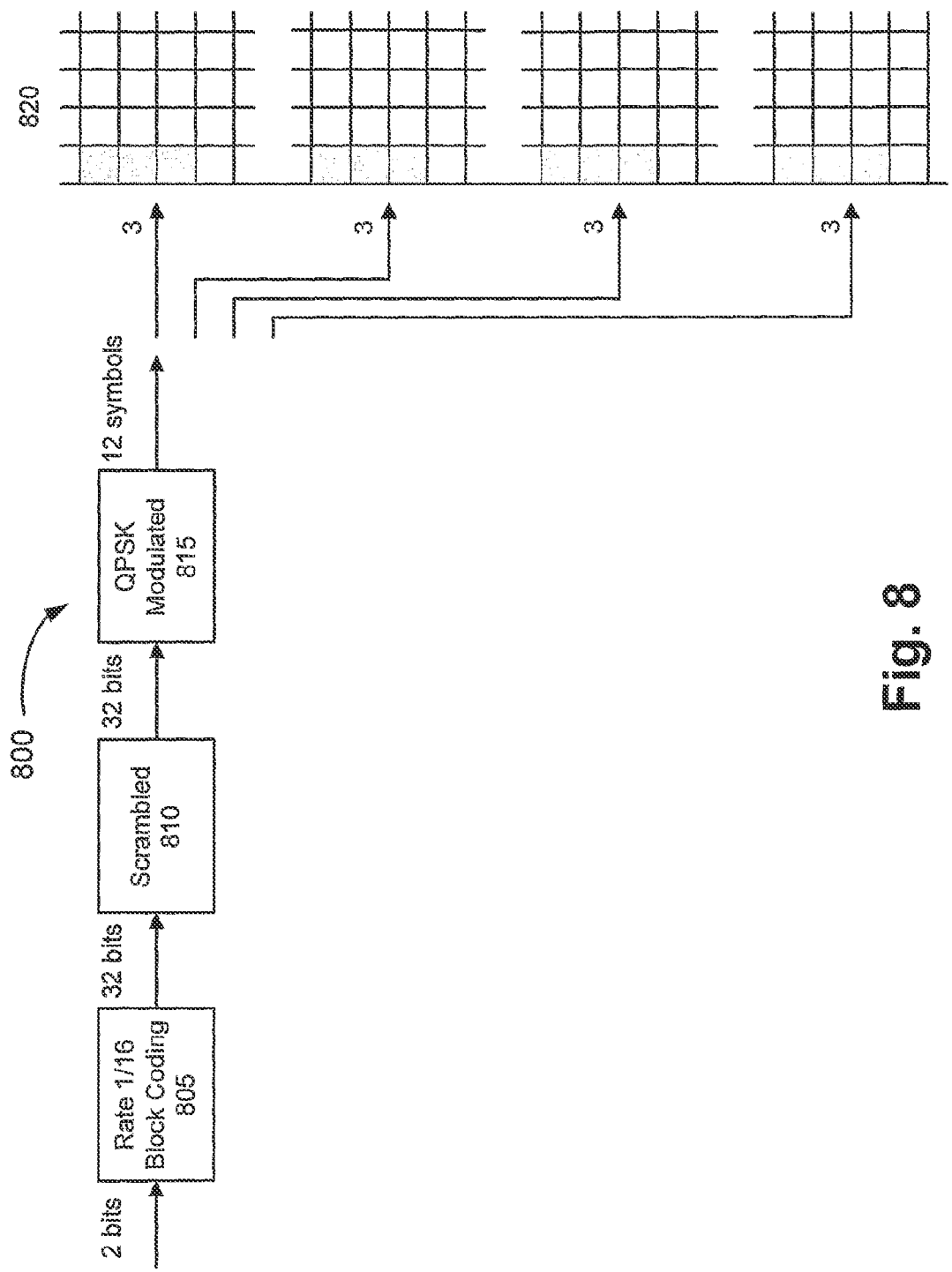
FIG. 8 is a diagram illustrating an exemplary PCFICH processing scheme.
Figure 9:
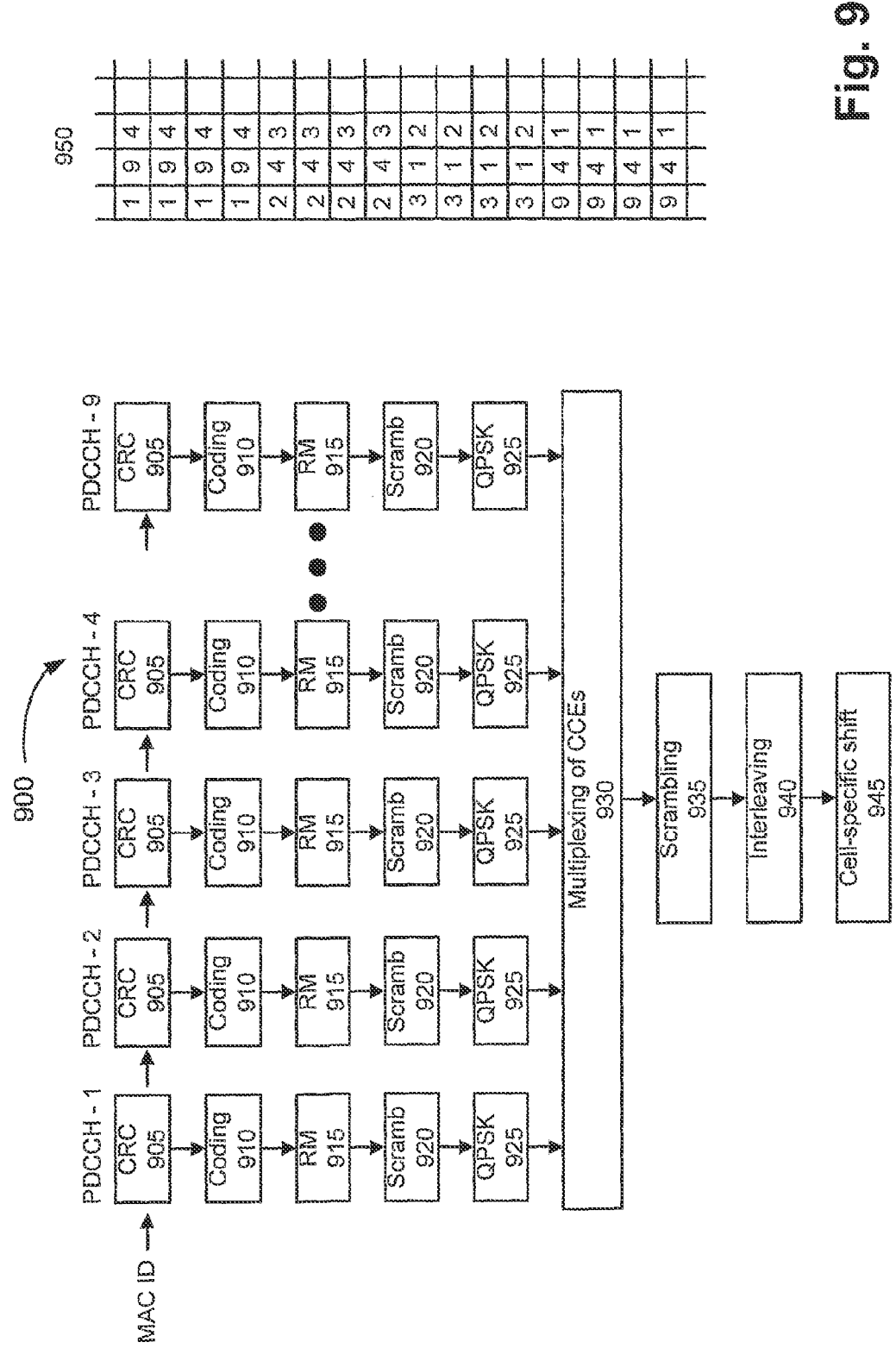
FIG. 9 is a diagram illustrating an exemplary PDCCH processing scheme.
Figure 10:
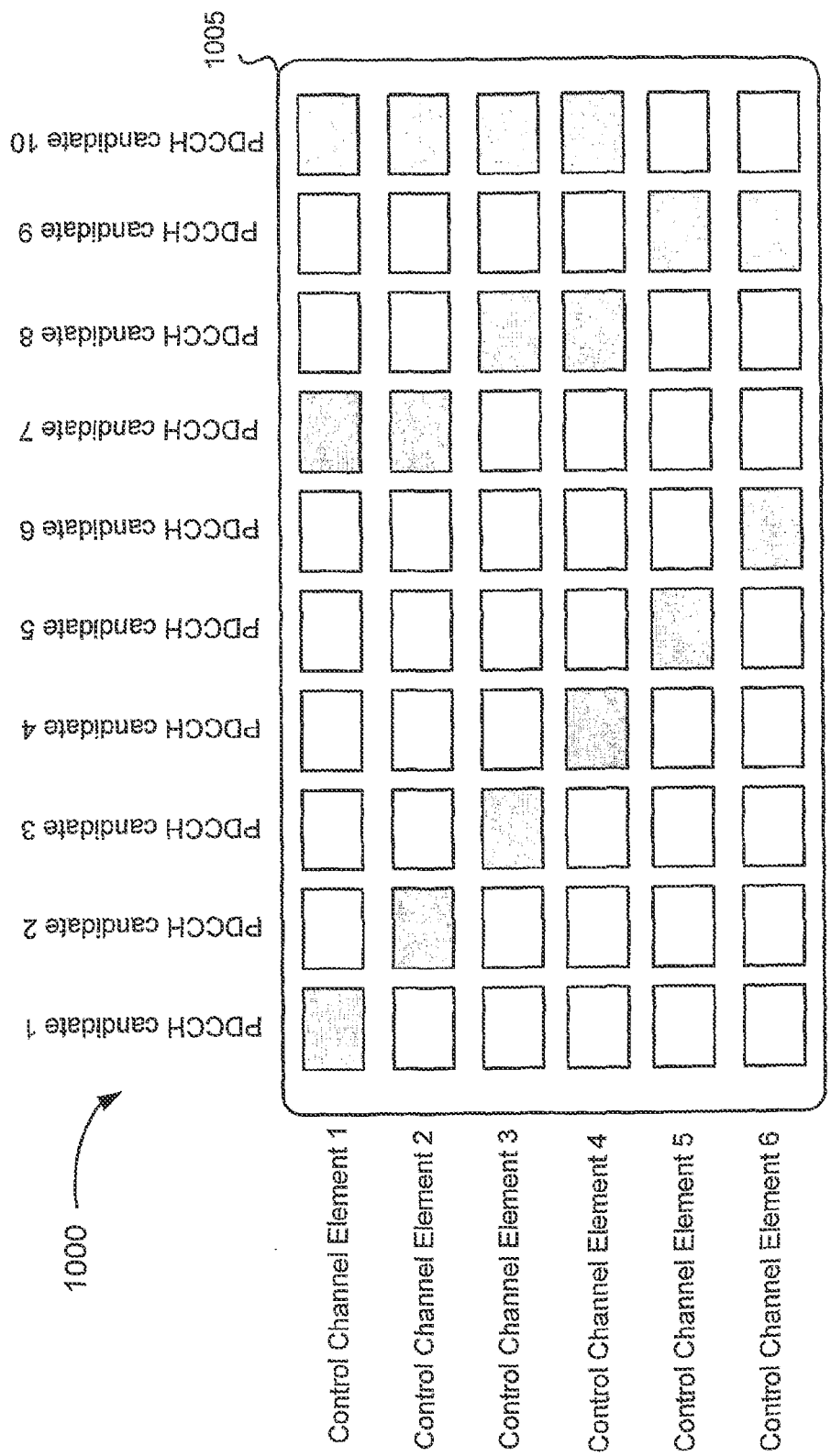
FIG. 10 is a diagram illustrating an exemplary blind PDCCH processing scheme that may occur in a UE.
Figure 11:
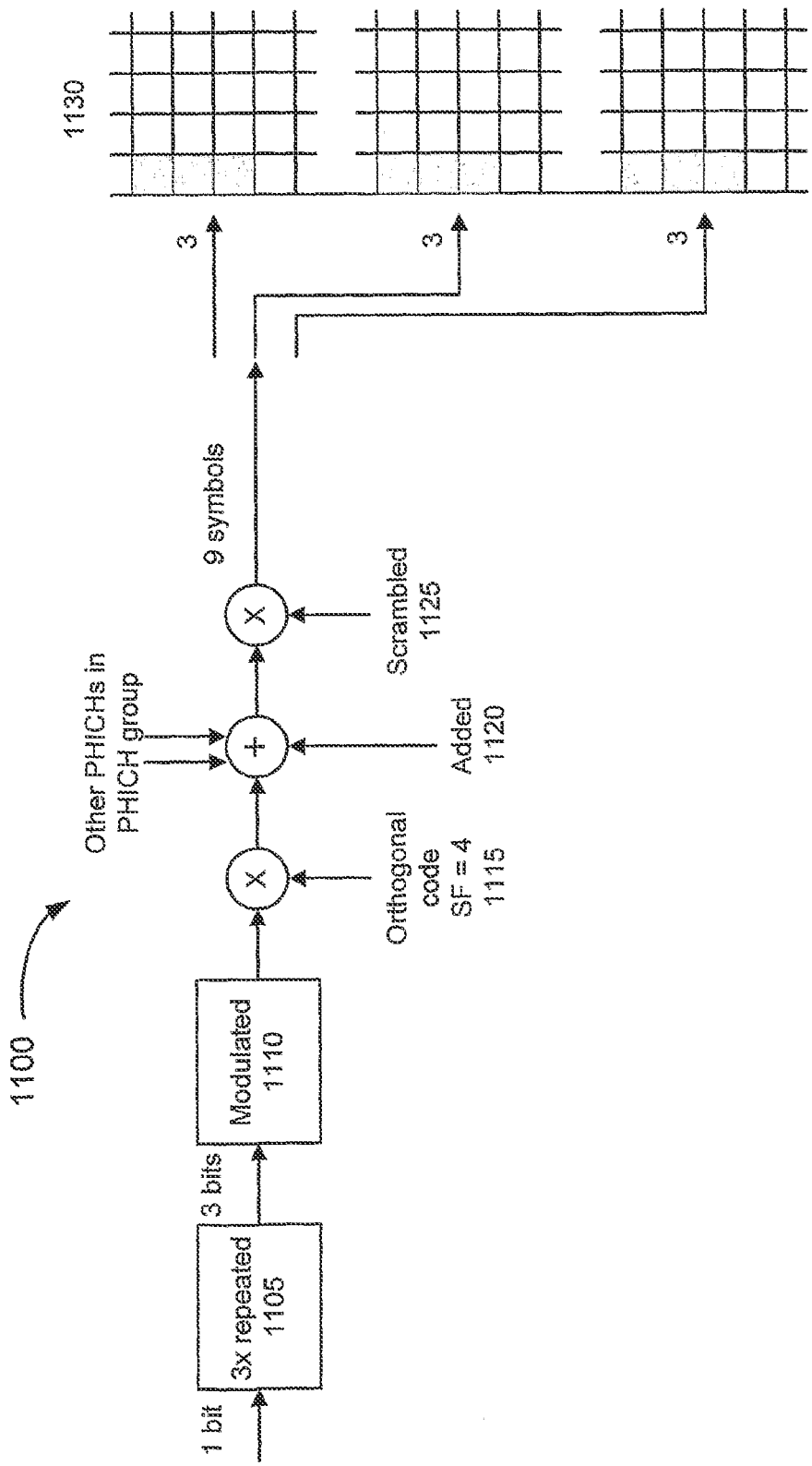
FIG. 11 is a diagram illustrating an exemplary PHICH processing scheme.

A terminal identifier may be associated with the enhanced signal (block 1615). For example, wireless station 1315 may associate a terminal identifier (e.g., a MAC ID or a RNTI) of a non-legacy terminal, such as non-legacy terminal 1305-1, with the enhanced signal. In one implementation, as previously described in connection with FIG. 9, wireless station 1315 may include a terminal identifier as part of an encoding calculation (e.g., in a CRC calculation).

The enhanced signal may be transmitted on a control channel (block 1620). For example, wireless station 1315 may transmit the enhanced signal on a control channel. In one implementation, the control channel may correspond to a PDCCH.

The terminal identifier associated with the enhanced signal may be determined (block 1625). For example, upon reception of the control channel, non-legacy terminal 1305-1 and legacy terminals 1305-2 or 1305-3 may determine whether the enhanced signal is intended for them by comparing its terminal identifier with a decoding of the enhanced signal and/or message that includes the enhanced signal (e.g., frame, sub-frame, etc.) having the associated terminal identifier. In such an instance, since wireless station 1315 associated the terminal identifier of non-legacy terminal 1305-1 with the enhanced signal and/or message, legacy terminals 1305-2 or 1305-3 would determine that the enhanced signal and/or message is not intended for them. On the other hand, non-legacy terminal 1305-1 may determine that the enhanced signal and/or message is intended for it since the decoded terminal identifier and its own terminal identifier should match.

The enhanced signal may be processed on the non-legacy terminal (block 1630). For example, upon determining that the enhanced signal and/or message is intended for it, non-legacy terminal 1305-1 may process the enhanced signal.

Although FIG. 16 illustrates an exemplary process 1600, in other implementations, fewer, additional, or different operations may be performed.

Figure 17:
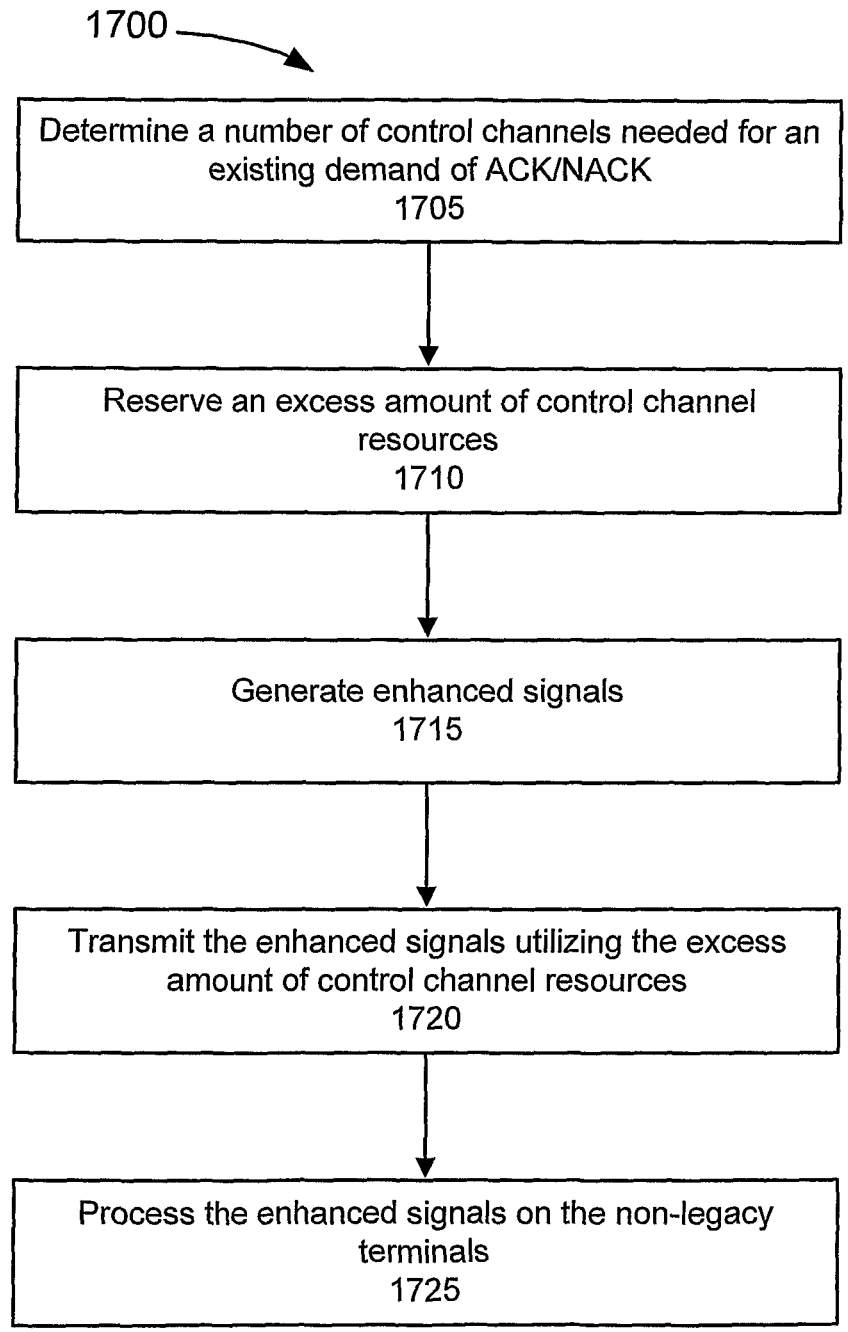

FIG. 17 is a flow diagram illustrating an exemplary process 1700 that may be employed for introducing enhanced signaling on a control channel. It will be appreciated that various standards employ some form of ACK/NACK in their respective communication scheme. Process 1700 may begin with determining a number of control channels needed for an existing demand of acknowledgements (ACK) and/or negative acknowledgements (NACK) (block 1705). For example, wireless station 1315 may determine the number of control channels and/or control channel resources based on received uplink transmissions from terminals 1305.

An excess amount of control channel resources may be reserved (block 1710). Wireless station 1315 may reserve control channel resources and/or control channels in excess of the determined number of control channels and/or control channel resources needed for existing demands. In instances when this operation is performed in the E-UTRAN, wireless station 1315 may reserve REs for more than the determined number of PHICHs. For example, if wireless station 1315 determines that 8 PHICHs are needed for transmission of hybrid-ARQ acknowledgements, wireless station 1315 may reserve REs for more than 8 PHICHs.

The enhanced signals may be generated (block 1715). For example, wireless station 1315 may generate an enhanced signal. In one implementation, the enhanced signal may include a control signal. The control signal may relate to channel estimation, cell search, cell acquisition, synchronization, power control, etc. In one implementation, the enhanced signal may correspond to a reference signal of an enhanced version of the E-UTRAN standard.

The enhanced signals may be transmitted utilizing the excess amount of control channel resources reserved at block 1710 (block 1720). For example, wireless station 1315 may transmit the enhanced signals utilizing the excess amount of control channel resources and/or control channels. In instances when this operation is performed in the E-UTRAN, wireless station 1315 may transmit the enhanced signals utilizing the excess REs over the PHICHs.

The enhanced signals may be processed on the non-legacy terminal (block 1725). For example, non-legacy terminal 1305-1 may receive the enhanced signals and process the enhanced signals.

Although FIG. 17 illustrates an exemplary process 1700, in other implementations, fewer, additional, or different operations may be performed.

Figure 18:
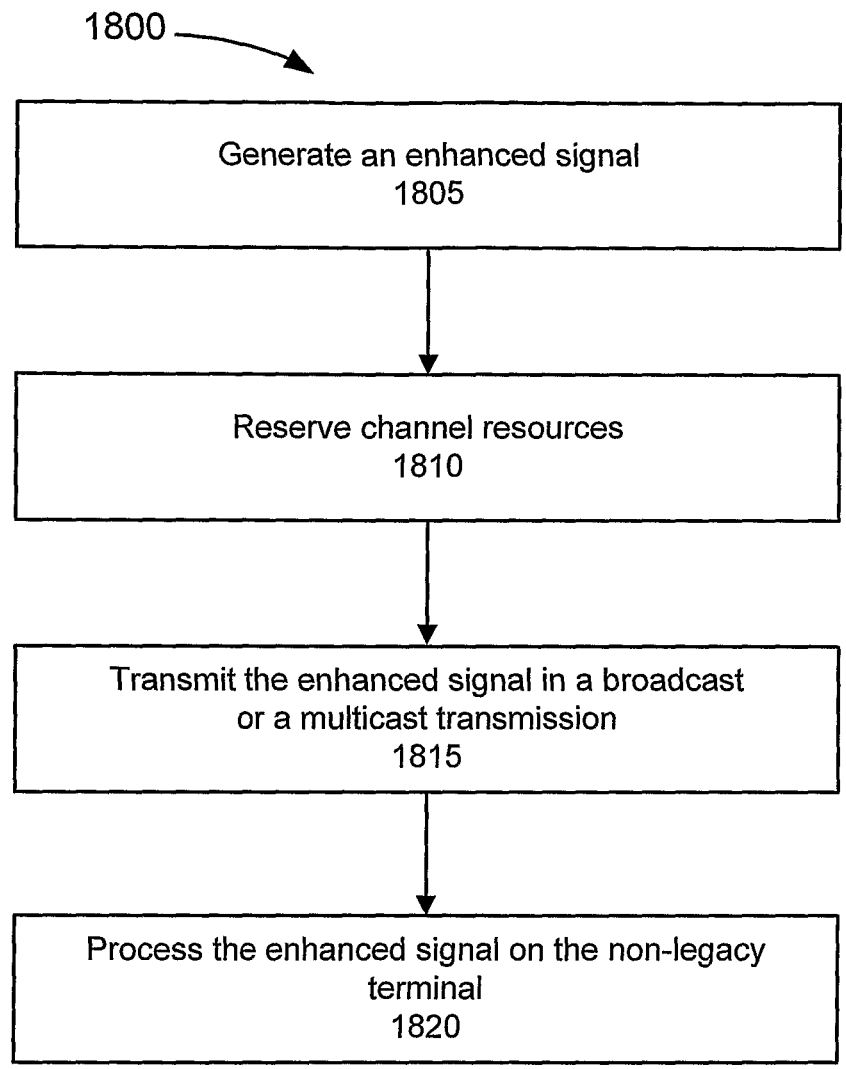

FIG. 18 is a flow diagram illustrating an exemplary process 1800 that may be employed for introducing enhanced signaling within a broadcast transmission or a multicast transmission. Since a broadcast transmission or a multicast transmission may be received by legacy terminals and non-legacy terminals, legacy terminals may be instructed to ignore a transmission and/or frames therein which include the enhanced signals. Legacy terminals may also ignore a transmission and/or frames therein which include the enhanced signals as it is not instructed to not do so; it can not decode the information and/or for other reasons e.g. that no multicast and/or broadcast service is available to legacy terminals on those frames.

Process 1800 may begin by generating an enhanced signal (block 1805). For example, wireless station 1315 may generate an enhanced signal. In one implementation, wireless station 1315 may include multiple wireless stations 1315.

Figure 12:
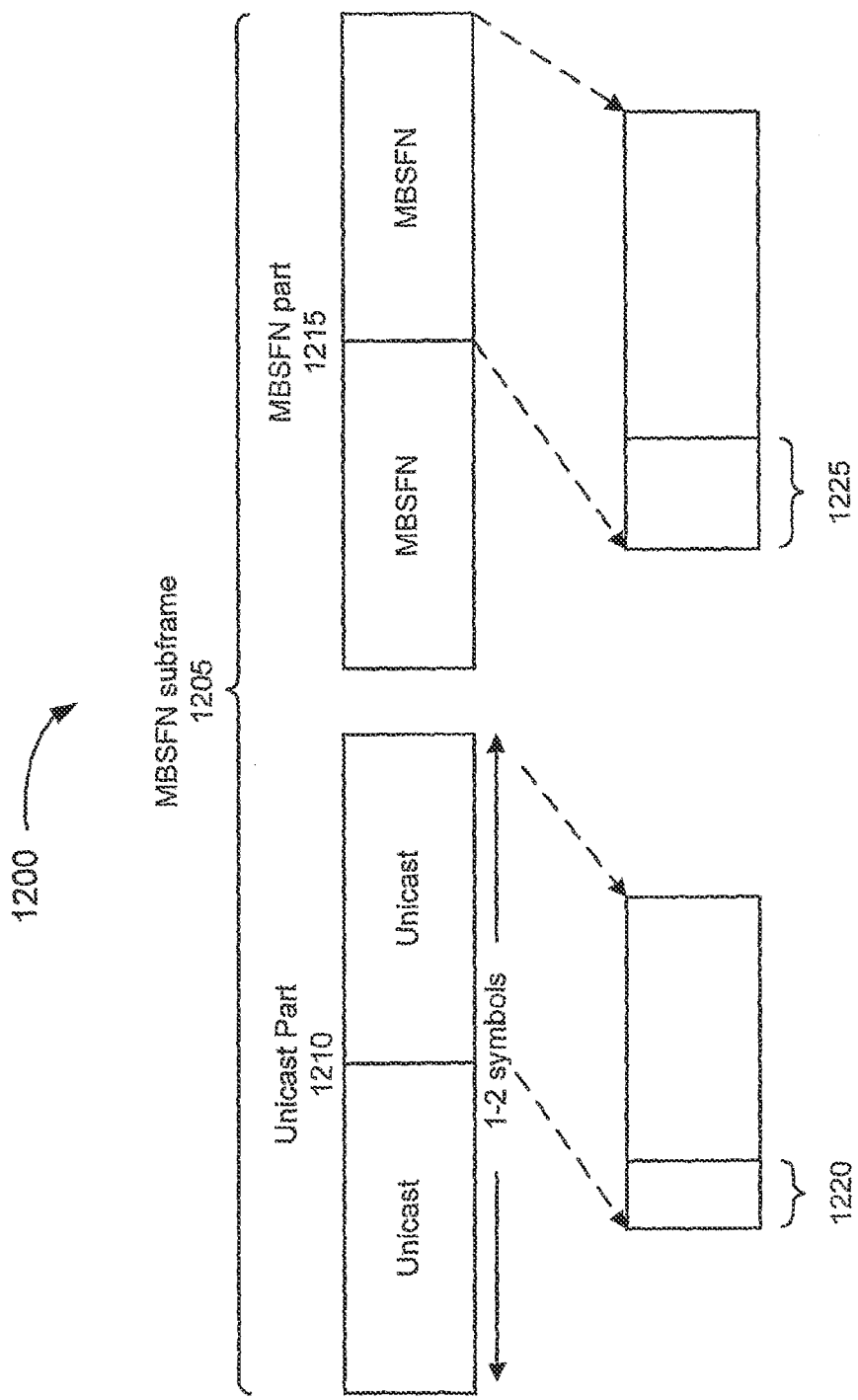
FIG. 12 is a diagram illustrating an exemplary MBSFN sub-frame.

Channel resources may be reserved (block 1810). For example, wireless station(s) 1315 may reserve channels resources. In some instances, a standard may include broadcast channels and/or multicast channels for multicast and/or broadcast transmissions. In one implementation, as previously described in connection with FIG. 12, MBSFN transmissions in LTE may take place utilizing specific sub-frames. In this regard, wireless station(s) 1315 may select a sub-frame appropriate for a MBSFN transmission.

The enhanced signal may be transmitted in a broadcast or a multicast transmission using the reserved channel resources (block 1815). Wireless station(s) 1315 may transmit the enhanced signal in a multicast transmission or a broadcast transmission. In LTE, wireless station(s) 1315 may transmit the enhanced signal in a MBSFN transmission. The MBSFN transmission may include some frames for legacy terminals and some frames for non-legacy terminals. In other instances, the MBSFN transmission may be entirely dedicated toward an enhanced signaling schema.

The enhanced signal may be processed on the non-legacy terminal (block 1820). Non-legacy terminal 1305-1 may receive the MBSFN transmission and process the enhanced signal. Legacy terminals 1305-2 and 1305-3 would ignore the MBSFN transmission because the content of the enhanced signal would appear as a MBSFN transmission to which legacy terminals 1305-2 and 1305-3 do not subscribe.

Although FIG. 18 illustrates an exemplary process 1800, in other implementations, fewer, additional, or different operations may be performed. It will be appreciated that in the context of the LTE standard, a MBSFN transmission may accommodate a large number of reference symbols for enhanced signals.

Figure 19:
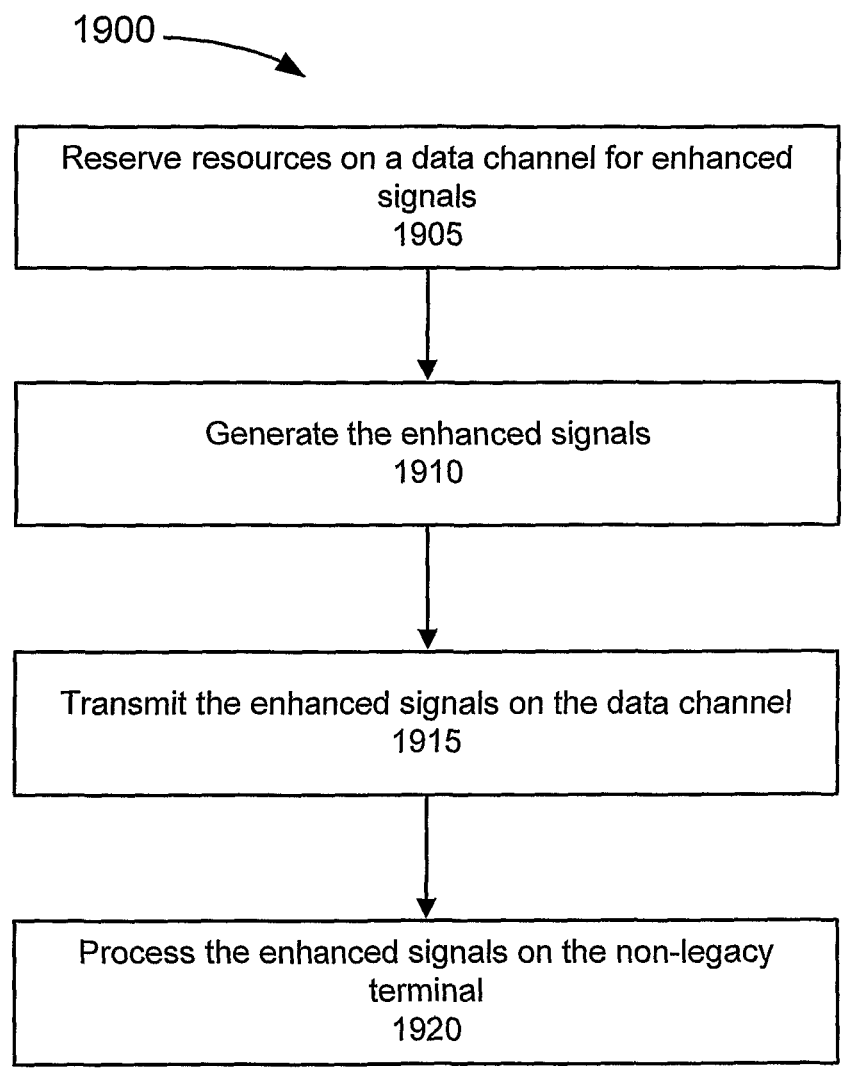

FIG. 19 is a flow diagram illustrating an exemplary process 1900 that may be employed for introducing enhanced signaling on a data channel. Process 1900 may begin with reserving resources on a data channel for enhanced signals (block 1905). For example, wireless station 1315 may reserve resources on a data channel. The reserved resources may be allocated for non-legacy terminal 1305-1. In one implementation, the data channel may correspond to a PDSCH. The PDSCH may be mapped to REs and/or resource blocks.

Enhanced signals may be generated (block 1910). For example, wireless station 1315 may generate an enhanced signal. The enhanced signals may be transmitted on the data channel (block 1915). For example, wireless station 1315 may transmit the enhanced signal on the data channel. The transmission may be based on a scheduled transmission with non-legacy terminal 1305-1. In one implementation, the enhanced signal may be transmitted on the PDSCH. In such an instance, wireless station 1315 may utilize resource blocks not scheduled for legacy terminals 1305-2 and 1305-3.

The enhanced signals may be processed on the non-legacy terminal (block 1920). Non-legacy terminal 1305-1 may receive the enhanced signal on the data channel and process the enhanced signal. Non-legacy terminals 1305-2 or 1305-3 may ignore the enhanced signal since the transmission was not scheduled.

Although FIG. 19 illustrates an exemplary process 1900, in other implementations, fewer, additional, or different operations may be performed.

According to the concepts described herein, various mechanisms may be utilized to introduce enhanced signaling within a wireless network. It will be appreciated that these various mechanisms may be employed within any number of communication standards. Additionally, it will be appreciated that the operation of legacy terminals may not be adversely impacted, while non-legacy terminals may be afforded new or additional functionalities and/or services within the wireless network. In this regard, future applications and/or future functionality may be injected into a wireless network based on enhanced signaled.

CONCLUSION

The foregoing description of implementations provides illustration, but is not intended to be exhaustive or to limit the implementations to the precise form disclosed. Modifications and variations are possible in light of the above teachings or may be acquired from practice of the teachings.

In addition, while series of blocks have been described with regard to processes illustrated in FIGS. 16-19, the order of the blocks may be modified in other implementations. Further, non-dependent blocks may be performed in parallel. Further one or more blocks may be omitted.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

It should be emphasized that the term "comprises" or "comprising" when used in the specification is taken to specify the presence of stated features, integers, steps, or components but does not preclude the presence or addition of one or more other features, integers, steps, components, or groups thereof.

No element, act, or instruction used in the present application should be construed as critical or essential to the implementations described herein unless explicitly described as such. Also, as used herein, the article "a" and "an" are intended to include one or more items. Where only one item is intended, the term "one" or similar language is used. Further, the phrase "based on" is intended to mean "based, at least in part, on" unless explicitly stated otherwise. As used herein, the term "and/or" includes any and all combinations of one or more of the associated list items.

The invention claimed is:

1. A method performed by wireless station in a wireless telecommunication network, the wireless station capable of supporting a legacy terminal and a non-legacy terminal, comprising:
    generating an enhanced signal that provides a function not supported in a communication standard corresponding to a specification of the legacy terminal, and wherein the function is supported by the non-legacy terminal;
    providing the enhanced signal to a downlink transmitter;
    associating a terminal identifier with the enhanced signal by determining a terminal identifier of the non-legacy terminal;
    encoding the terminal identifier with the enhanced signal; and
    transmitting the enhanced signal according to the communication standard using a channel of the communication standard, with the terminal identifier, whereby a legacy terminal is able to determine that the enhanced signal is not intended for the legacy terminal.

2. The method of claim 1, wherein the enhanced signal includes a control signal relating to at least one of channel estimation, measurements, cell search, cell acquisition, power control, and synchronization.

3. The method of claim 1, further comprising:
determining an amount of control channel resources to meet a current demand; and
reserving an excess amount of control channel resources; and
wherein transmitting the enhanced signal comprises transmitting the enhanced signal utilizing the excess amount of control channel resources.

4. A method performed by wireless station in a wireless telecommunication network, the wireless station capable of supporting a legacy terminal and a non-legacy terminal, comprising:
generating an enhanced signal that provides a multicast service function or broadcast service function not supported in a communication standard corresponding to a specification of the legacy terminal, and wherein the function is supported by the non-legacy terminal;
providing the enhanced signal to a downlink transmitter;
associating a terminal identifier with the enhanced signal by determining a terminal identifier of the non-legacy terminal;
encoding the terminal identifier with the enhanced signal; and
transmitting the enhanced signal with the terminal identifier according to the communication standard using a channel of the communication standard, on frames or sub-frames on which no multicast service or broadcast service is subscribed by a legacy terminal, whereby the legacy terminal will ignore those frames or sub-frames.

5. The method of claim 4, further comprising:
selecting sub-frames to be transmitted as multicast/broadcast single-frequency network (MBSFN) sub-frames; and
inserting the enhanced signal in one or more of the MBSFN sub-frames.

6. The method of claim 4 wherein the communication standard comprises a long term evolution (LTE) communication standard.

7. A method performed by a legacy terminal and a non-legacy terminal operative in a wireless telecommunication network, each terminal having a terminal identifier, comprising:
receiving an enhanced signal that provides a function not supported in a communication standard corresponding to a specification of the legacy terminal, and wherein the enhanced signal provides a function supported in a communication standard corresponding to a specification of the non-legacy terminal, wherein the received enhanced signal is encoded with a terminal identifier, and
determining whether the enhanced signal can be processed by decoding the terminal identifier;
comparing the decoded terminal identifier with its own terminal identifier and
processing the enhanced signal if the decoded terminal identifier matches its own terminal identifier and not processing the enhanced signal if the decoded terminal identifier does not match its own terminal identifier.

8. The method of claim 7, wherein the received enhanced signal is encoded with the terminal identifier corresponding to a terminal identifier of the non-legacy terminal.

9. The method of claim 8, wherein the received enhanced signal includes a reference signal.

10. The method of claim 7, wherein the enhanced signal is received on a control channel.

11. The method of claim 7, wherein the enhanced signal includes control information associated with a broadcast channel not supported in the communication standard.

12. The method of claim 7, wherein non-legacy terminals are configured to detect the presence of the enhanced signal.

13. The method of claim 12, wherein said enhanced signal is detected by means of higher-layer signaling.

14. A wireless station in a wireless telecommunication environment, the wireless station capable of serving a legacy terminal and a non-legacy terminal, comprising:
one or more antennas; and
a processing system operative to
generate an enhanced signal that provides a function not supported in a communication standard corresponding to a specification of the legacy terminal, and wherein the enhanced signal provides a function capable of being performed by the non-legacy terminal;
provide the enhanced signal to the one or more antennas;
transmit the enhanced signal according to a channel structure of the communication standard,
determine a terminal identifier of the non-legacy terminal;
encode the terminal identifier with the enhanced signal; and
associate the terminal identifier with the enhanced signal, whereby a legacy terminal is able to determine that the enhanced signal is not intended for the legacy terminal.

15. A non-legacy mobile terminal operative in a wireless telecommunication environment, comprising:
one or more antennas; and
a processing system operative to
receive an enhanced signal, the enhanced signal including a function that a legacy terminal is incapable of performing, wherein the legacy terminal operates according to a communication standard, and the non-legacy mobile terminal operates according to an enhanced version of the communication standard, and wherein the enhanced signal is received by the non-legacy mobile terminal in a format of the communication standard, and encoded with a terminal identifier, and
perform the function if the decoded terminal identifier matches the terminal identifier of the non-legacy terminal.

* * * * *